(12) United States Patent
Hong

(10) Patent No.: US 12,414,183 B2
(45) Date of Patent: Sep. 9, 2025

(54) METHOD AND DEVICE FOR DYNAMICALLY SWITCHING A TRANSMISSION METHOD FOR RECEIVING MBS DATA BASED ON SPLIT RADIO BEARER STRUCTURE

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 458 days.

(21) Appl. No.: 17/762,033

(22) PCT Filed: Sep. 10, 2020

(86) PCT No.: PCT/KR2020/012223
§ 371 (c)(1),
(2) Date: Mar. 18, 2022

(87) PCT Pub. No.: WO2021/054674
PCT Pub. Date: Mar. 25, 2021

(65) Prior Publication Data
US 2022/0338291 A1 Oct. 20, 2022

(30) Foreign Application Priority Data

Sep. 20, 2019 (KR) .................. 10-2019-0116276
Sep. 8, 2020 (KR) .................. 10-2020-0114350

(51) Int. Cl.
*H04W 28/02* (2009.01)
*H04L 12/28* (2006.01)
(Continued)

(52) U.S. Cl.
CPC ......... *H04W 76/19* (2018.02); *H04L 12/2859* (2013.01); *H04L 12/2861* (2013.01);
(Continued)

(58) Field of Classification Search
CPC ............ H04L 12/2859; H04L 12/2861; H04L 2012/5641; H04L 2012/5642; H04W 28/0252; H04W 72/12; H04B 1/76
See application file for complete search history.

(56) References Cited

U.S. PATENT DOCUMENTS

| 2006/0035645 A1* | 2/2006 | Kim | ................... H04W 36/10 455/445 |
| 2013/0088979 A1* | 4/2013 | Bi | ..................... H04L 5/006 370/312 |

(Continued)

FOREIGN PATENT DOCUMENTS

| EP | 3017616 A1 | 5/2016 |
| EP | 3050329 A1 | 8/2016 |

(Continued)

OTHER PUBLICATIONS

I. G. Fraimis, V. D. Papoutsis, K. Ioannou and S. A. Kotsopoulos, "Power efficient radio bearer selection for MBMS users in soft handover status," 2009 IEEE 20th International Symposium on Personal, Indoor and Mobile Radio Communications, Tokyo, Japan, 2009, pp. 2571-2575 (Year: 2009).*

(Continued)

*Primary Examiner* — Salvador E Rivas
(74) *Attorney, Agent, or Firm* — IP Legal Services, LLC

(57) ABSTRACT

Provided are a method and device for switching between unicast transmission and multicast/broadcast service (MBS) transmission in a cellular wireless communication network. The method for a base station to switch MBS data transmission may include: transmitting configuration information for reception of MBS data of a user equipment (UE) to the UE; transmitting information instructing a change of radio bearer for the reception of the MBS data to the UE; and receiving a packet data convergence protocol (PDCP) status report from the UE.

14 Claims, 16 Drawing Sheets

(51) Int. Cl.
    *H04W 4/06*      (2009.01)
    *H04W 76/19*     (2018.01)
    *H04W 72/12*     (2023.01)
    *H04W 74/0833*   (2024.01)

(52) U.S. Cl.
    CPC ......... *H04W 4/06* (2013.01); *H04W 28/0252* (2013.01); *H04W 72/12* (2013.01); *H04W 74/0833* (2013.01)

(56) References Cited

U.S. PATENT DOCUMENTS

| | | | |
|---|---|---|---|
| 2016/0157065 A1 | 6/2016 | Lee et al. | |
| 2016/0165412 A1 | 6/2016 | Lee et al. | |
| 2016/0315868 A1* | 10/2016 | Zhang | H04L 47/624 |
| 2016/0374050 A1 | 12/2016 | Prasad et al. | |
| 2017/0332213 A1* | 11/2017 | Xu | H04W 4/08 |
| 2017/0374581 A1 | 12/2017 | Dao | |
| 2018/0035405 A1* | 2/2018 | Fujishiro | H04W 72/30 |
| 2018/0092146 A1* | 3/2018 | Hong | H04W 76/15 |
| 2018/0124850 A1* | 5/2018 | Wu | H04W 88/06 |
| 2018/0249481 A1 | 8/2018 | Xu et al. | |
| 2018/0332444 A1 | 11/2018 | Natarajan et al. | |
| 2018/0359614 A1* | 12/2018 | Yu | H04W 4/10 |
| 2019/0045577 A1 | 2/2019 | Kim et al. | |
| 2019/0166580 A1 | 5/2019 | Prasad et al. | |
| 2019/0215725 A1 | 7/2019 | Kim et al. | |
| 2021/0112452 A1 | 4/2021 | Kim et al. | |
| 2022/0150997 A1* | 5/2022 | Xu | H04W 4/06 |

FOREIGN PATENT DOCUMENTS

| | | |
|---|---|---|
| EP | 3017616 B1 | 12/2018 |
| EP | 3050329 B1 | 8/2019 |

OTHER PUBLICATIONS

3GPP, "TR 23.846 version 6.1.0", Dec. 2012 (Year: 2012).*
European Patent Office, European Search Report of corresponding EP Patent Application No. 20864860.0, Jul. 31, 2023.

* cited by examiner

METHOD AND DEVICE FOR DYNAMICALLY SWITCHING A TRANSMISSION METHOD FOR RECEIVING MBS DATA BASED ON SPLIT RADIO BEARER STRUCTURE

CROSS REFERENCE TO RELATED APPLICATIONS

This application is a National Stage Patent Application of PCT International Patent Application No. PCT/KR2020/012223 (filed on Sep. 10, 2020) under 35 U.S.C. § 371, which claims priority to Korean Patent Application Nos. 10-2019-0116276 (filed on Sep. 20, 2019) and 10-2020-0114350 (filed on Sep. 8, 2020), the teachings of which are incorporated herein in their entireties by reference.

TECHNICAL FIELD

The present disclosure relates to a method and device for switching between unicast transmission and multicast/broadcast service (MBS) transmission in a cellular wireless communication network.

BACKGROUND ART

Cellular mobile communication networks have been developed to provide end-to-end/point-to-point transmission services. Due to the development of broadband wireless transmission technologies and user equipments (UEs) providing various functions, there is a growing demand for a variety of services. In particular, multimedia broadcast multicast service (MBMS) has been introduced and provides mobile broadcast services using cellular mobile communication networks. Recently, technologies for providing disaster safety communication services using enhanced-MBMS (hereinafter, eMBMS) services have been introduced.

Unlike end-to-end transmission services, MBMS is an end-to-many/point-to-multipoint transmission service and has an advantage in that a base station transmits the same packet to a plurality of UEs within one cell to increase the efficiency of radio resource use. In addition, the MBMS service employs a multi-cell transmission scheme in which a plurality of base stations transmits the same packet simultaneously. When using the multi-cell transmission scheme, the UEs receiving the services may obtain a diversity gain in a physical layer.

However, when the base station transmits MBMS service data, efficiency may vary depending on the number of UEs receiving the data. Accordingly, in order for the base station to more efficiently transmit the MBMS service data, it is required to develop a method of dynamically changing a transmission type of MBMS service data.

DISCLOSURE

Technical Problem

The present embodiment provides a method and an apparatus for changing a transmission type of data that is dynamically transmitted from a base station to a plurality of UEs.

Technical Solution

In an aspect of the present embodiments, a method of switching multicast/broadcast service (MBS) data transmission by a base station includes transmitting MBS data to a user equipment (UE) according to a first transmission type, determining whether to change the first transmission type in which the MBS data is being transmitted, transmitting switching instruction information to the UE when it is determined that the first transmission type is to be changed to a second transmission type, and transmitting the MBS data in the second transmission type.

In another aspect of the present embodiments, a method of switching MBS data reception by a UE includes receiving MBS data from a base station according to a first transmission type, receiving switching instruction information from the base station when it is determined that the base station changes the first transmission type to a second transmission type, performing processing for receiving the MBS data in the second transmission type based on the switching instruction information, and receiving the MBS data in the second transmission type.

In still another aspect of the present embodiments, a base station for switching MBS data transmission includes a transmitter configured to transmit MBS data to a UE according to a first transmission type and a control unit configured to determine whether to change the first transmission type in which the MBS data is being transmitted, in which the transmitter transmits switching instruction information to the UE when it is determined that the first transmission type is to be changed to a second transmission type, and transmits the MBS data in the second transmission type.

In yet another aspect of the present embodiments, a UE for switching MBS data reception includes a receiver configured to receive MBS data from a base station according to a first transmission type, and receive switching instruction information from the base station when it is determined that the base station changes the first transmission type to the second transmission type, and a controller configured to perform processing for receiving the MBS data in the second transmission type based on the switching instruction information, in which the receiver receives the MBS data in the second transmission type, and when the first transmission type is a unicast transmission type, the second transmission type is a multicast or broadcast transmission type, and when the second transmission type is the multicast or broadcast transmission type, the first transmission type is the unicast transmission type.

Advantageous Effects

According to the present embodiment, it is possible to improve the efficiency of an overall system because a base station dynamically changes a transmission type.

BEST MODE

Figure 1:
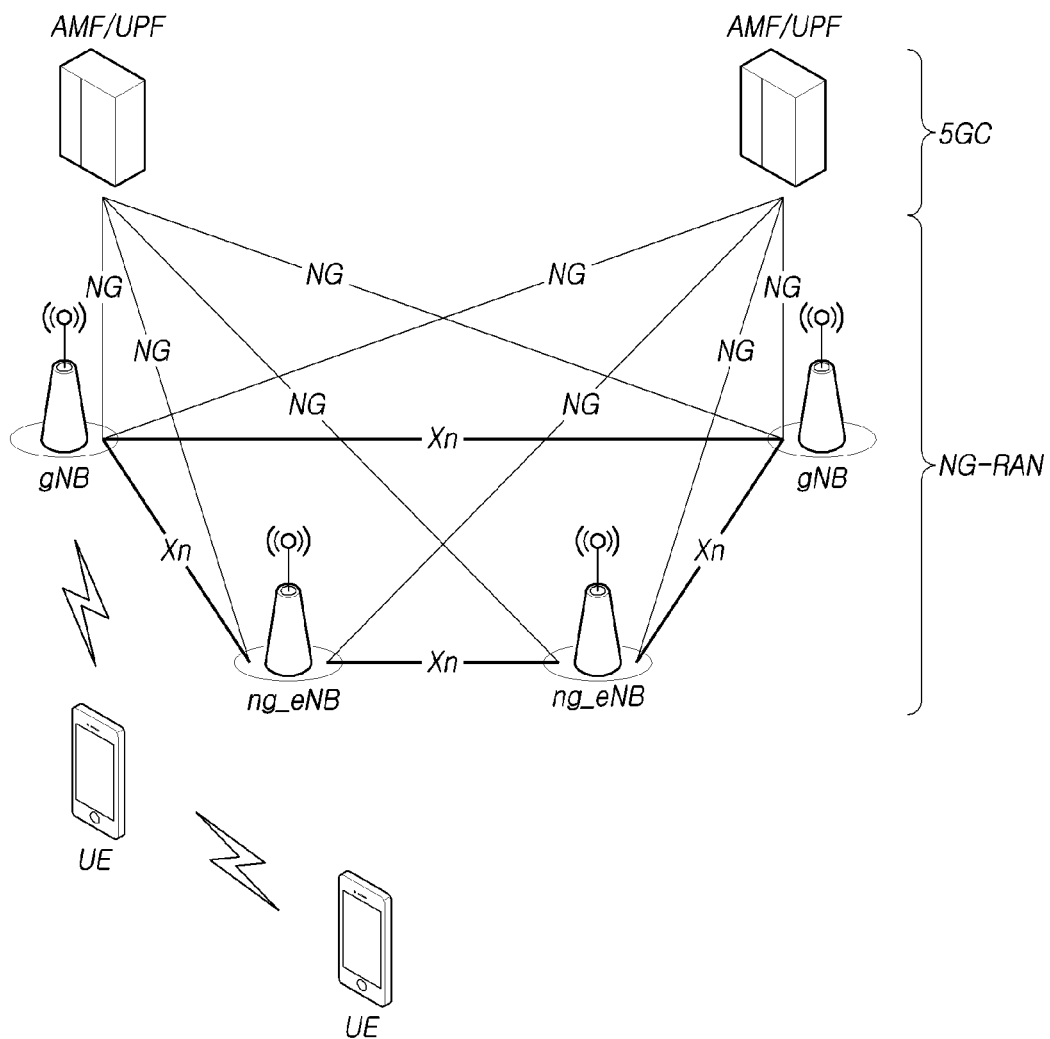
FIG. 1 is a diagram schematically illustrating a structure of a new radio (NR) wireless communication system.

Hereinafter, some embodiments of the present disclosure will be described in detail with reference to the accompanying drawings. In adding reference numerals to components of each drawing, the same components are denoted by the same reference numerals even when the components are illustrated in different drawings. Further, in describing the present embodiments, when it is determined that a detailed description of a related known configuration or function may obscure the gist of the present technical idea, the detailed description thereof may be omitted. When "includes," "has," "composed of," etc., described in this specification are used, other parts may be added unless "only" is used. When a component is expressed in the singular, the component may include a case expressed in the plural unless otherwise explicitly stated.

In addition, terms first, second, A, B, (a), (b), and the like, will be used in describing components of the present disclosure. These terms are used only in order to distinguish one component from other components, and the features, sequences, or the like, of corresponding components are not limited by these terms.

In the description of a positional relationship of components, when it is described that two or more components are "connected," "coupled, or "linked," etc., two or more components may be directly "connected," "coupled," or "linked," to each other, but it should be understood that two or more components may be "connected," "coupled," or "linked" to each other via other components further "interposed" therebetween. Here, other components may be included in either of two or more components that are "connected," "coupled," or "linked" to each other.

In the description of a temporal flow relationship related to components, operation methods, manufacturing methods, or the like, for example, cases where a temporal sequence relationship or a flow sequence relationship such as "after," "—subsequent to," "next," and "before," is described may include cases where it is not continuous unless "immediately" or "directly" is used.

Meanwhile, when numerical values or the corresponding information (e.g., level, etc.) for components are described, even when there is no explicit description, the numerical values or the corresponding information may be interpreted as including an error range that may occur due to various factors (e.g., process factors, internal or external shock, noise, etc.).

A wireless communication system in the present specification refers to a system for providing various communication services such as voice and data packets using radio resources. The wireless communication system may include a user equipment (UE), a base station, a core network, or the like.

The present embodiments disclosed below may be applied to wireless communication systems using various radio access technologies. For example, the present embodiments may be applied to various radio access technologies such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). In addition, the radio access technology may be not only a specific access technology, but also communication technologies for each generation established by various telecommunication consultation organizations such as $3^{rd}$ Generation Partnership Project (3GPP), $3^{rd}$ Generation Partnership Project 2 (3GPP2), Wireless Fidelity (WiFi), Bluetooth, the Institute of Electrical and Electronics Engineers (IEEE), and the International Telecommunication Union (ITU). For example, the CDMA may be implemented with radio technologies such as universal terrestrial radio access (UTRA) or CDMA-2000. The TDMA may be implemented with radio technologies such as global system for mobile communications (GSM)/general packet ratio service (GPRS)/enhanced data rate for GSM evolution (EDGE). The OFDMA may be implemented with radio technologies such as IEEE 802.11 (Wi-Fi), IEEE 802.16 (WiMAX), IEEE 802.20, and evolved UTRA (E-UTRA). The IEEE 802.16m is evolved from IEEE 802.16e and provides backward compatibility with a system based on the IEEE 802.16e. The UTRA is a part of a universal mobile telecommunication system (UMTS). 3GPP LTE is a part of an evolved UMTS (E-UMTS) using the E-UTRA and employs the OFDMA in a downlink and the SC-FDMA in an uplink. As such, the present embodiments may be applied to currently disclosed or commercialized radio access technologies or may be applied to radio access technologies currently under development or to be developed in the future.

Meanwhile, in the present specification, a UE is a comprehensive conceptual term denoting a device including a wireless communication module for performing communication with a base station in a wireless communication system. The UE should be interpreted as a term referring not only a UE for wideband code division multiple access (WCDMA), LTE, new radio (NR), high speed packet access (HSPA), International Mobile Telecommications-2000 (IMT-2020) (5th-Generation (5G) or New Radio), or the like, but also a mobile station (MS), a user terminal (UT), a subscriber station (SS), a wireless device, or the like for GSM. In addition, the UE may be a user portable device such as a smart phone depending on the type of use, and in a vehicle-to-everything (V2X) communication system, may be a vehicle, a device including a wireless communication module in the vehicle, or the like. In addition, in the case of a machine type communication system, the UE may be a machine type communication (MTC) terminal, a machine to machine (M2M) terminal, an ultra-reliable low latency communications (URLLC) terminal, or the like, which is equipped with a communication module, in order to perform machine type communication.

A base station or cell in the present specification refers to a terminal that communicates with a UE in terms of a network and refers to including all of various coverage areas such as a node-B, an evolved node-B (eNB), a gNode-B (gNB), a low power node (LPN), a sector, a site, various types of antennas, a base transceiver system (BTS), an access point, a point (e.g., transmission point, reception point, transmission/reception point), a relay node, a mega cell, a macro cell, a micro cell, a pico cell, a femto cell, a remote radio head (RRH), a radio unit (RU), and a small cell. In addition, the cell may refer to including a bandwidth part (BWP) in a frequency domain. For example, the serving cell may be an activation BWP of a UE.

In the various cells listed above, since there is a base station for controlling one or more cells, the base station may be interpreted in two meanings. 1) In relation to a radio area, the base station may be a device itself providing a mega cell, a macro cell, a micro cell, a pico cell, a femto cell, or a small cell, or 2) the base station may indicate a radio area itself. In 1), the base station may denote all devices for providing a predetermined radio area that are controlled by the same entity or all devices for interacting to form a radio area cooperatively. The base station may include a point, a transmission/reception point, a transmission point, a reception point, and the like according to a scheme of configuring a radio area become an embodiment of a base station. In 2), the base station may denote a radio area itself in which signals are received or transmitted from a point of view of a UT or neighboring base stations.

In the present specification, a cell may be a transmission/reception point itself of a component carrier that has a coverage of a signal transmitted from a transmission/reception point or a coverage of a signal transmitted from a transmission/reception point (transmission point or transmission/reception point).

An uplink (UL) refers to data transmission from a UE to a base station, and a downlink (DL) refers to data transmission from a base station to a UE. The downlink may be communication or a communication path from a multi-transmission/reception point to a UE, and the uplink may be communication or a communication path from the UE to the multi-transmission/reception point. In this case, in the downlink, a transmitter may be a part of multi-transmission/reception points, and a receiver may be a part of a UE. Further, in the uplink, the transmitter may be a part of a UE, and the receiver may be a part of the multi-transmission/reception points.

The uplink and downlink transmit and receive control information through control channels such as a physical downlink control channel (PDCCH) and a physical uplink control channel (PUCCH) and transmit and receive data by configuring data channels such as a physical downlink shared channel (PDSCH) and a physical uplink shared channel (PUSCH). Hereinafter, signal transmission and reception through the channels such as the PUCCH, PUSCH, PDCCH and PDSCH may be expressed in the form of "transmitting and receiving the channels such as PUCCH, PUSCH, PDCCH and PDSCH."

For clarity of description, the present embodiments will be described based on 3GPP LTE/LTE-A/new RAT (NR) communication systems below. However, the present embodiments are not limited to the corresponding communication systems.

In 3GPP, after research on 4th-generation (5G) communication technology, 5th-generation (5G) communication technology is being developed to meet requirements of a next-generation radio access technology of the ITU Radio-communication Sector (ITU-R). Specifically, 3GPP develops LTE-A pro, which improved LTE-advanced technology to meet the requirements of the ITU-R as 5G communication technology, and a new NR communication technology separate from 4G communication technology. Both the LTE-A pro and NR refer to 5G communication technology. Hereinafter, 5G communication technology will be described focusing on NR unless a specific communication technology is specified.

The 4G LTE scenario defines various operation scenarios by additionally considering satellites, automobiles, new verticals, and the like, and the NR operation scenario supports an enhanced mobile broadband (eMBB) scenario in terms of services, a massive machine communication (mMTC) scenario that has a high terminal density, but is deployed over a wide range and requires a low data rate and asynchronous access, and an ultra reliability and low latency (URLLC) scenario that requires high responsiveness and reliability and can support high-speed mobility.

To satisfy the scenario, NR discloses a wireless communication system to which a new waveform and frame structure technology, a low latency technology, an ultra-high frequency band (mmWave) support technology, and a forward compatible providing technology are applied. In particular, in the NR system, various technological changes are presented in terms of flexibility in order to provide forward compatibility. The main technical features of NR will be described with reference to the drawings below.

<NR System General>

FIG. 1 is a diagram schematically illustrating a structure of an NR system.

Referring to FIG. 1, the NR system is divided into a 5G core network (5GC) and a new radio-radio access network (NR-RAN) part, and a next generation-RAN (NG-RAN) is composed of next generation NodeBs (gNBs) and next-generation e-NodeBs (ng-eNBs) for providing a user plane (service data adaptation protocol (SDAP)/packet data convergence protocol (PDCP)/radio link control (RLC)/media access control (MAC)/physical layer (PHY)) and a control plane (radio resource control (RRC)) protocol termination for a UE. The gNBs are interconnected or the gNBs and ng-eNBs are interconnected via an Xn interface. The gNBs and ng-eNBs are each connected to the 5GC through an NG interface. The 5GC may include an access and mobility management function (AMF) in charge of the control plane such as UE access and mobility control functions and a user plane function (UPF) in charge of a control function for user data. NR includes support for both a frequency band (frequency range 1 (FR1)) less than or equal to 6 GHz and a frequency band (frequency range 2 (FR2)) more than or equal to 6 GHz.

The gNB refers to a base station that provides a NR user plane and control plane protocol termination to a UE, and the ng-eNB refers to a base station that provides an evolved-universal mobile telecommunication system terrestrial radio access (E-UTRA) user plane and control plane protocol termination to a UE. The base station described in this specification should be understood as including the gNB and ng-eNB. Alternatively, the base station may refer the gNB or ng-eNB separately if necessary.

<NR Waveform, Numerology and Frame Structure>

In NR, a cyclic prefix-orthogonal frequency division multiplexing (CP-OFDM) waveform using a cyclic prefix is used for downlink transmission, and CP-OFDM or discrete Fourier transform-spread-orthogonal frequency division multiplexing (DFT-s-OFDM) is used for uplink transmission. The OFDM technology has advantages of being easily joined to multiple input multiple output (MIMO) and using a low-complexity receiver with high frequency efficiency.

Meanwhile, in NR, since the requirements for data rate, latency rate, coverage, etc., are different for each of the three scenarios described above, it is necessary to efficiently satisfy the requirements for each scenario through a frequency band constituting an arbitrary NR system. To this end, a technology for efficiently multiplexing a plurality of different numerology-based radio resources has been proposed.

Specifically, the NR transmission numerology is determined based on subcarrier spacing and a cyclic prefix (CP), and a value of $\mu$ is used as an exponential value of 2 based on 15 kHz as shown in Table 1 below and is changed exponentially.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
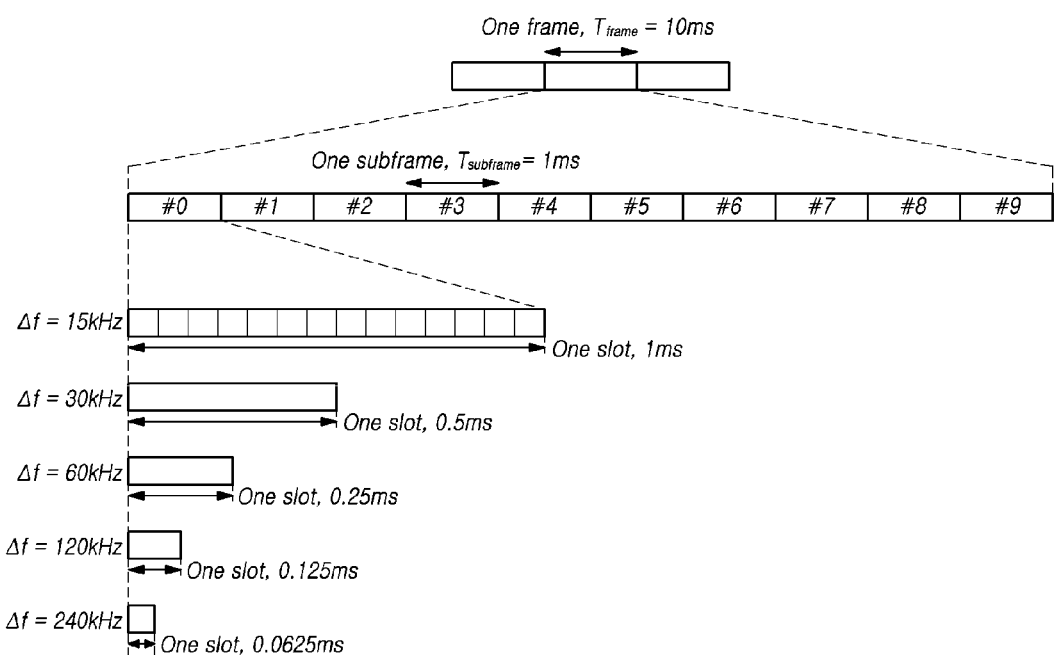
FIG. 2 is a diagram for describing a frame structure in an NR system.

As shown in Table 1 above, the NR numerology may be divided into five types according to the subcarrier spacing. This is different from the fact that the subcarrier spacing of LTE, one of the 4G communication technologies, is fixed at 15 kHz. Specifically, in NR, subcarrier spacings used for data transmission are 15, 30, 60, and 120 kHz, and subcarrier spacings used for synchronization signal transmission are 15, 30, 120, and 240 kHz. Also, extended CP is applied only to the 60 kHz subcarrier spacing. Meanwhile, for the frame structure in NR, a frame having a length of 10 ms is defined, which is composed of 10 subframes having the same length of 1 ms. One frame may be divided into half frames of 5 ms, and each half frame includes 5 subframes. In the case of the 15 kHz sub-carrier spacing, one subframe is composed of one slot, and each slot is composed of 14 OFDM symbols. FIG. 2 is a diagram for describing a frame structure in an NR system.

Referring to FIG. 2, a slot is fixedly composed of 14 OFDM symbols in the case of a normal CP, but a length of a slot in a time domain may vary according to the sub-carrier spacing. For example, in the case of the numerology having the 15 kHz sub-carrier spacing, the slot has a length of 1 ms that is the same length as the subframe. On the other hand, in the case of the numerology having the 30 kHz sub-carrier spacing, a slot is composed of 14 OFDM symbols, but two slots may be included in one subframe having a length of 0.5 ms. That is, the subframe and the frame are defined to have a fixed time length, and the slot is defined by the number of symbols, and thus, the time length may vary according to the sub-carrier spacing.

Meanwhile, NR defines a basic unit of scheduling as a slot, and NR also introduces a mini-slot (or a sub-slot or a non-slot based schedule) in order to reduce a transmission delay in a radio section. When the wide sub-carrier spacing is used, the length of one slot is shortened in inverse proportion, so it is possible to reduce the transmission delay in the radio section. The mini-slot (or sub-slot) is for efficient support of an ultra-reliable low latency communications (URLLC) scenario and may be scheduled in units of 2, 4, or 7 symbols.

Also, unlike LTE, NR defines uplink and downlink resource allocation by a symbol level within one slot. In order to reduce a hybrid automatic repeat request (HARQ) delay, a slot structure capable of transmitting HARQ ACK/NACK directly within a transmission slot has been defined, and this slot structure will be referred to and described as a self-contained structure.

NR is designed to support a total of 256 slot formats. Among 256 slot formats, 62 slot formats are used in 3rd Generation Partnership Project Release-15 (3GPP Rel-15). In addition, a common frame structure constituting a frequency division duplex (FDD) or time division duplex (TDD) frame is supported through a combination of various slots. For example, a slot structure in which all symbols of a slot are set to downlink, a slot structure in which all symbols are set to uplink, and a slot structure in which downlink symbols and uplink symbols are joined are supported. In addition, NR supports that data transmission is scheduled to be distributed in one or more slots. Accordingly, the base station may notify the UE whether the slot is a downlink slot, an uplink slot, or a flexible slot using a slot format indicator (SFI). The base station may indicate the slot format by indicating an index of a table configured through UE-specific RRC signaling using the SFI, and the base station may dynamically indicate the slot format through downlink control information (DCI) or may statically or semi-statically indicate the slot format through RRC.

<NR Physical Resources>

In NR, an antenna port, a resource grid, a resource element, a resource block, a carrier part, etc. may be considered as physical resources.

First, the antenna port is defined such that a channel for carrying a symbol on the antenna port may be inferred from a channel for carrying another symbol on the same antenna port. When the large-scale property of a channel for carrying a symbol on one antenna port may be inferred from a channel for carrying a symbol on another antenna port, the two antenna ports may have a quasi co-located or quasi co-location (QC/QCL) relationship. Here, the wide range characteristic includes one or more of delay spread, Doppler spread, frequency shift, received average power, and received timing.

Figure 3:
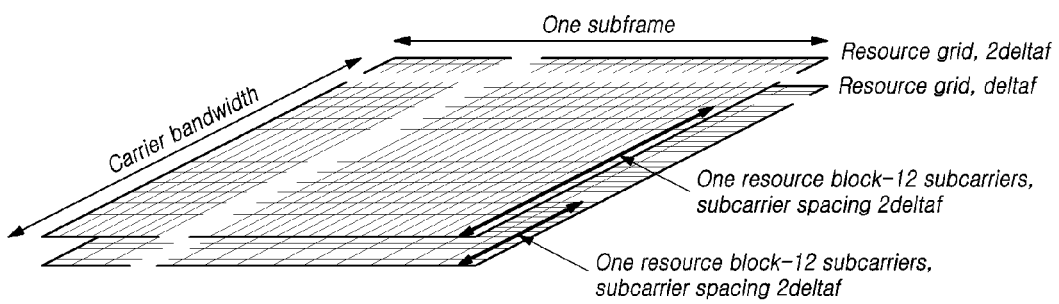
FIG. 3 is a diagram for describing a resource grid supported by a radio access technology.

FIG. 3 is a diagram for describing a resource grid supported by a radio access technology.

Referring to FIG. 3, since NR supports a plurality of numerologies on the same carrier, a resource grid may be defined according to each numerology. In addition, a resource grid may be defined according to the antenna port, the sub-carrier spacing, and a transmission direction.

The resource block is composed of 12 subcarriers and defined only in a frequency domain. In addition, the resource element is composed of one OFDM symbol and one sub-carrier. Accordingly, as illustrated in FIG. 3, a size of one resource block may vary according to the sub-carrier spacing. In addition, NR defines "point A" serving as a common reference point for the resource block grid, a common resource block, a virtual resource block, and the like.

Figure 4:
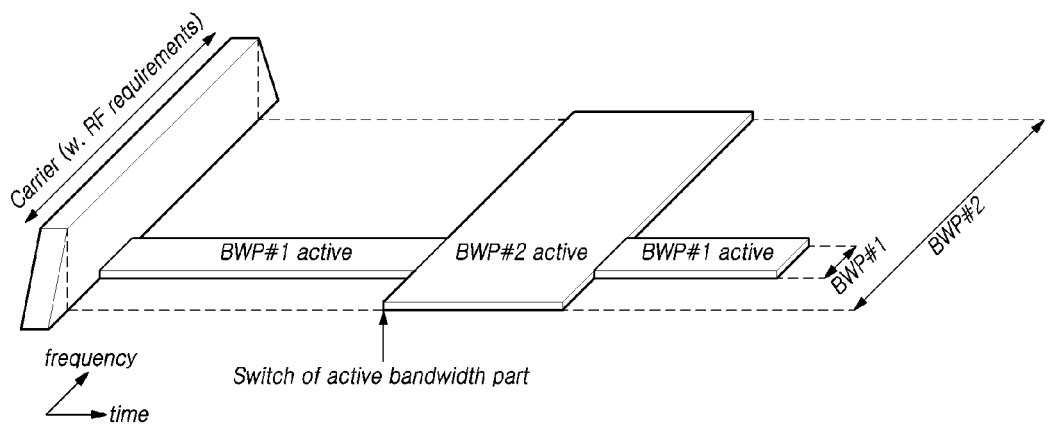
FIG. 4 is a diagram for describing a bandwidth part supported by the radio access technology.

FIG. 4 is a diagram for describing a bandwidth part (BWP) supported by a radio access technology.

In LTE, a carrier bandwidth is fixed at 20 Mhz. Unlike LTE, a maximum carrier bandwidth is set in the range from 50 Mhz to 400 Mhz for each sub-carrier spacing in NR. Therefore, it is not assumed that all UEs use all of these carrier bandwidths. Accordingly, in NR, as illustrated in FIG. 4, the BWP may be designated within the carrier bandwidth and used by the UE. In addition, the BWP is associated with one numerology and composed of a subset of consecutive common resource blocks, and the BWP may be dynamically activated over time. A maximum of four BWPs are configured in a UE in each of the uplink and downlink, and data is transmitted/received using the activated BWP at a given time.

In the case of a paired spectrum, the uplink and downlink BWPs are configured independently. In the case of an unpaired spectrum, the downlink and uplink BWPs are configured in pairs to share a center frequency in order to prevent unnecessary frequency re-tuning during downlink and uplink operations.

<NR Initial Access>

In NR, a UE accesses the base station and performs a cell search and random access procedure in order to perform communication.

The cell search is a procedure in which the UE synchronizes to the cell of the corresponding base station using a synchronization signal block (SSB) transmitted by the base station, obtains a physical layer cell identifier (ID), and obtains system information.

Figure 5:
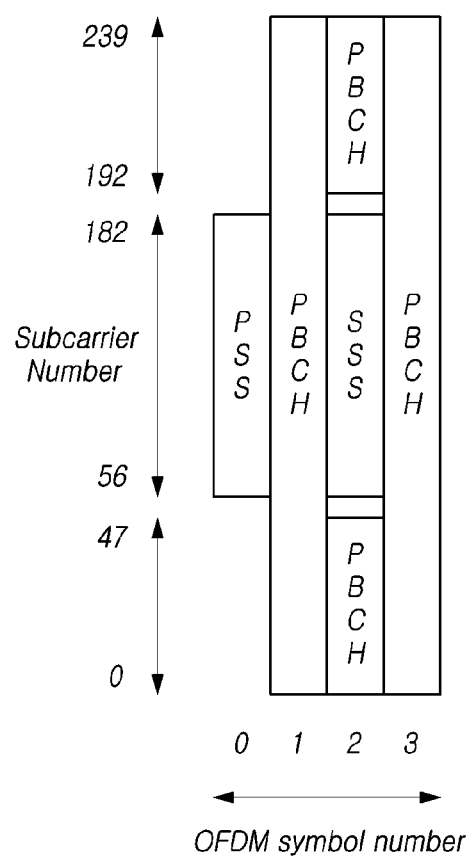
FIG. 5 is a diagram illustrating an exemplary synchronization signal block in the radio access technology.

FIG. 5 is a diagram exemplarily illustrating an SSB in the radio access technology.

Referring to FIG. 5, the SSB is composed of a primary synchronization signal (PSS) and a secondary synchronization signal (SSS) each occupying 1 symbol and 127 subcarriers and a physical broadcast channel (PBCH) spanning 3 OFDM symbols and 240 sub-carriers.

The UE receives the SSB by monitoring the SSB in the time and frequency domains.

The SSB may be transmitted up to 64 times within 5 ms. A plurality of SSBs is transmitted using different transmission beams within 5 ms, and the UE performs detection on the assumption that the SSB is transmitted every 20 ms based on one specific beam used for transmission. The number of beams used for SSB transmission within 5 ms time may increase as the frequency band increases. For example, up to 4 SSB beams may be transmitted in a frequency band of 3 GHz or less, and the SSB may be transmitted using up to 8 different beams in a frequency band of 3 to 6 GHz and up to 64 different beams in a frequency band of 6 GHz or more.

Two SSBs are included in one slot, and a start symbol and the number of repetitions within the slot are determined according to the sub-carrier spacing as illustrated below.

On the other hand, unlike the SS of the typical LTE, the SSB is not transmitted at the center frequency of the carrier bandwidth. That is, the SSB may be transmitted at a frequency rather than the center of the system band, and a plurality of SSBs may be transmitted in the frequency domain when the broadband operation is supported. Accordingly, the UE monitors the SSB using a synchronization raster that is a candidate frequency location for monitoring the SSB. The carrier raster and synchronization raster, which are the center frequency location information of the channel for initial access, are newly defined in NR. Compared to the carrier raster, the synchronization raster has a wider frequency spacing, so the UE may support a fast SSB search.

The UE may acquire a master information block (MIB) through the PBCH of the SSB. The MIB includes minimum information for the UE to allow a network to receive the remaining minimum system information (RMSI). In addition, the PBCH includes information on a position of a first demodulation reference signals (DM-RS) symbol in a time domain, information (e.g., system information block type 1 (SIB1) numerology information, SIB1 related information, control resource set (CORESET) related information, search space information, PDCCH related parameter information, etc.) for the UE to monitor SIB1, offset information (position of an absolute SSB within the carrier is transmitted through the SIB1) between a common resource block and the SSB, and the like. Here, the SIB1 numerology information is equally applied to some messages used in the random access procedure for accessing the base station after the UE completes the cell search procedure. For example, the SIB1 numerology information may be applied to at least one of messages 1 to 4 for the random access procedure.

The above-described RMSI may be the SIB1, and the SIB1 is periodically broadcast (e.g., 160 ms) in the cell. The SIB1 includes information necessary for a UE to perform the initial random access procedure and is periodically transmitted through the PDSCH. In order for the UE to receive the SIB1, the UE needs to receive numerology information used for the SIB1 transmission and the CORESET information used for scheduling the SIB1 through the PBCH. The UE checks scheduling information for the SIB1 by using a system information-radio network temporary ID (SI-RNTI) within the CORESET, and the UE acquires the SIB1 on the PDSCH according to the scheduling information. The SIBs except for the SIB1 may be transmitted periodically or transmitted according to the request of the UE.

Figure 6:
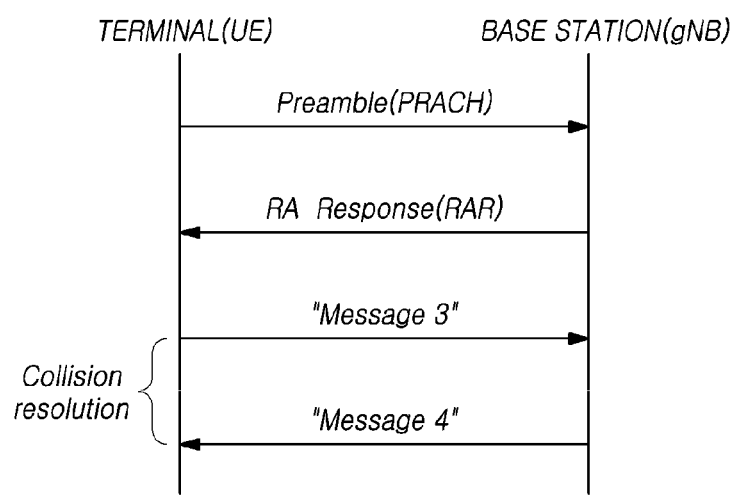
FIG. 6 is a diagram for describing a random access procedure in the radio access technology.

FIG. 6 is a diagram for describing the random access procedure in the radio access technology.

Referring to FIG. 6, upon completion of the cell search, the UE transmits a random access preamble for random access to the base station. The random access preamble is transmitted through a physical random access channel (PRACH). Specifically, the random access preamble is transmitted to the base station through the PRACH composed of consecutive radio resources in a specific slot that is periodically repeated. In general, when the UE initially accesses a cell, a contention-based random access procedure is performed, and when the random access is performed for beam failure recovery (BFR), a contention-free random access procedure is performed.

The UE receives a random access response to the transmitted random access preamble. The random access response may include a random access preamble ID, a UL grant (uplink radio resource), a temporary cell-radio network temporary ID (temporary C-RNTI), and a time alignment command (TAC). Since one random access response may include the random access response information for one or more UEs, the random access preamble ID may be included to notify for which UE the included UL grant, temporary C-RNTI, and TAC are valid. The random access preamble ID may be an ID for the random access preamble received by the base station. The TAC may be included as information for the UE to adjust the uplink synchronization. The random access response may be indicated by a random access ID on the PDCCH, that is, a random access-radio network temporary ID (RA-RNTI).

Upon receiving the valid random access response, the UE processes information included in the random access response and performs scheduled transmission to the base station. For example, the UE applies the TAC and stores the temporary C-RNTI. In addition, data stored in a buffer of the UE or newly generated data is transmitted to the base station by using the UL grant. In this case, information for identifying the UE should be included.

Finally, the UE receives a downlink message for contention resolution.

<NR CORESET>

In NR, the downlink control channel is transmitted in control resource set (CORESET) having a length of 1 to 3 symbols. The downlink control channel transmits uplink/ downlink scheduling information, slot format index (SFI) and transmit power control (TPC) information, etc.

In this way, NR introduced a CORESET concept in order to secure the flexibility of the system. The CORESET refers to a time-frequency resource for a downlink control signal. The UE may decode control channel candidates by using one or more search spaces in the CORESET time-frequency resource. The QCL assumptions for each CORESET are established, which are used for the purpose of notifying characteristics of an analog beam direction in addition to delay spread, Doppler spread, Doppler shift, and an average delay which are characteristics assumed by the conventional QCL.

Figure 7:
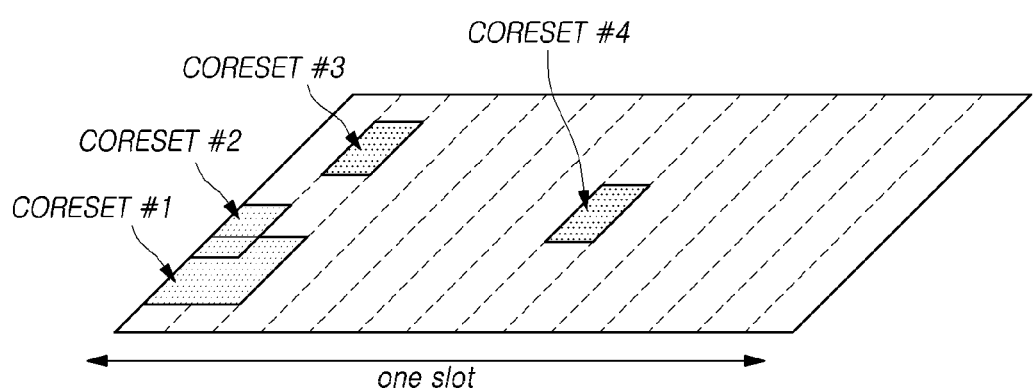
FIG. 7 is a diagram for describing a control resource set (CORESET).

FIG. 7 is a diagram for describing the CORESET.

Referring to FIG. 7, the CORESET may be defined in various forms within a carrier bandwidth within one slot, and the CORESET may be composed of up to three OFDM symbols in the time domain. In addition, the CORESET is defined as a multiple of 6 resource blocks up to the carrier bandwidth in the frequency domain.

The first CORESET is indicated through the MIB as part of an initial BWP configuration to receive additional configuration information and system information through a network. After the UE establishes a connection with the base station, the UE may be configured to receive one or more pieces of CORESET information through RRC signaling.

In the present specification, frequencies, frames, subframes, resources, resource blocks, regions, bands, subbands, control channels, data channels, synchronization signals, various reference signals, various signals, or various messages that are associated with NR may be interpreted in various meanings used in the past or present or used in the future.

New Radio (NR)

Lately, 3GPP introduced NR. Such NR is designed to satisfy various quality of service (QoS) requirements required for each subdivided and detailed usage scenario as well as an improved data rate compared to LTE. In particular, as representative usage scenarios of NR, enhancement mobile broadband (eMBB), massive machine type communications (mMTC), and ultra reliable and low latency communications (URLLC) were defined. For satisfying requirements for each usage scenario, it is required to design a flexible frame structure, compared to LTE. Each usage scenario has different requirements for data rates, latency, reliability, coverage, etc. Accordingly, a method of efficiently satisfying requirements for each usage scenario through a frequency band constituting a NR system is designed to efficiently multiplex different numerologies (e.g., subcarrier spacing, subframe, TTI, etc.) based radio resource units.

For example, discussions have been made for a method of multiplexing and supporting numerologies having different subcarrier spacing values based on TDM, FDM, or TDM/FDM through one or more NR component carriers. In addition, discussions have been made for a method of supporting one or more time units in configuring a scheduling unit in the time domain. In this regard, in NR, a subframe is defined as a type of time domain structure. Reference numerology for defining the subframe duration is determined to define a single subframe duration composed of 14 OFDM symbols of the same 15 kHz subcarrier spacing (SCS)-based normal CP overhead as that of LTE. Accordingly, in NR, a subframe has a time duration of 1 ms. However, unlike LTE, the subframe of NR is an absolute reference time duration, and as the time unit that is the basis of actual uplink/downlink data scheduling, a slot and a mini-slot may be defined. In this case, the number of OFDM symbols constituting the slot, a value of y, is determined to have a value of y=14 regardless of an SCS value in the case of a normal CP.

Accordingly, a slot is composed of 14 symbols. In addition, all symbols may be used for DL transmission, used for UL transmission, or used in the form of DL portion+(gap)+UL portion according to the transmission direction of the slot.

In addition, a mini-slot composed of fewer symbols than the above-described slot is defined in some numerology (or SCS). A short time-domain scheduling interval for mini-slot-based uplink/downlink data transmission/reception may be configured, or a long time-domain scheduling interval for uplink/downlink data transmission/reception through slot aggregation may be configured. In particular, in the case of transmitting and receiving latency-sensitive data such as URLLC, it is difficult to satisfy latency requirements when 1 ms (14 symbols)-based slot unit scheduling defined in a numerology-based frame structure with a small SCS value such as 15 kHz is performed. Accordingly, the scheduling that may satisfy the requirements of URLLC may be performed by defining a mini-slot composed of fewer OFDM symbols than a slot composed of 14 symbols.

Multimedia Broadcast Multicast Service (MBMS) in LTE Network

3GPP has developed LTE broadcast/multicast standards for video broadcasting from Rel-9. Thereafter, 3GPP introduced standards to support other services such as public safety, Internet of things (IoT), and vehicle-to-everything (V2X) in LTE. For NR, Rel-15 and Rel-16 standards do not support MBMS yet. Accordingly, it is expected to develop MBMS-related standards for NR.

Meanwhile, as the typical MBMS based on LTE, two transmission schemes pare provided, such as a multimedia broadcast multicast service single frequency network (MBSFN) transmission scheme and a single cell point to multipoint (SC-PTM) transmission scheme.

The MBSFN transmission scheme is a scheme suitable for providing media broadcasting in a large pre-planned area (MBSFN area). The MBSFN area is statically configured. For example, the MBSFN area is configured by operation & maintenance (O&M). The MBSFN area may not be dynamically adjusted according to a user distribution. The synchronized MBMS transmission is provided within the MBSFN area. Joining to MBMS transmission is also supported from multiple cells. Each multicast channel (MCH) scheduling is performed by a multi-cell/multicast coordination entity (MCE), and a single transport block is used for each time to interactive (TTI) for MCH transmission. In addition, the MCH transport block uses all MBSFN resources in the subframe. A multicast traffic channel (MTCH) and a multicast control channel (MCCH) may be multiplexed on the same MCH. The MTCH and MCCH use a radio link control-unacknowledged mode (RLC-UM). Even when all radio resources are not used in the frequency domain, the unicast and multiplexing are not allowed in the same subframe. As such, the MBSFN transmission scheme is difficult to be dynamically adjusted. Thus, the MBSFN is difficult to flexibly apply to small-scale broadcasting services.

The SC-PTM transmission scheme has been developed as a method of improving the inefficiency of the MBSFN transmission scheme. The MBMS is transmitted within single cell coverage. One single cell multicast control channel (SC-MCCH) and one or more single cell multicast traffic channels (SC-MTCHs) are mapped to a downlink shared channel (DL-SCH). The scheduling is provided by the base station. The SC-MCCH and SC-MTCH are each indicated by one logical channel-specific RNTI (single cell radio network temporary ID (SC-RNTI) or group RNTI (G-RNTI)) on the PDCCH. The SC-MTCH and SC-MCCH use the RLC-UM. A single transmission is used for the DL-SCH to which the SC-MCCH and the SC-MTCH are mapped, but blind HARQ repetition or RLC repetition is not provided. Therefore, it is difficult for the SC-PTM transmission to provide reliable transmission.

Figure 8:
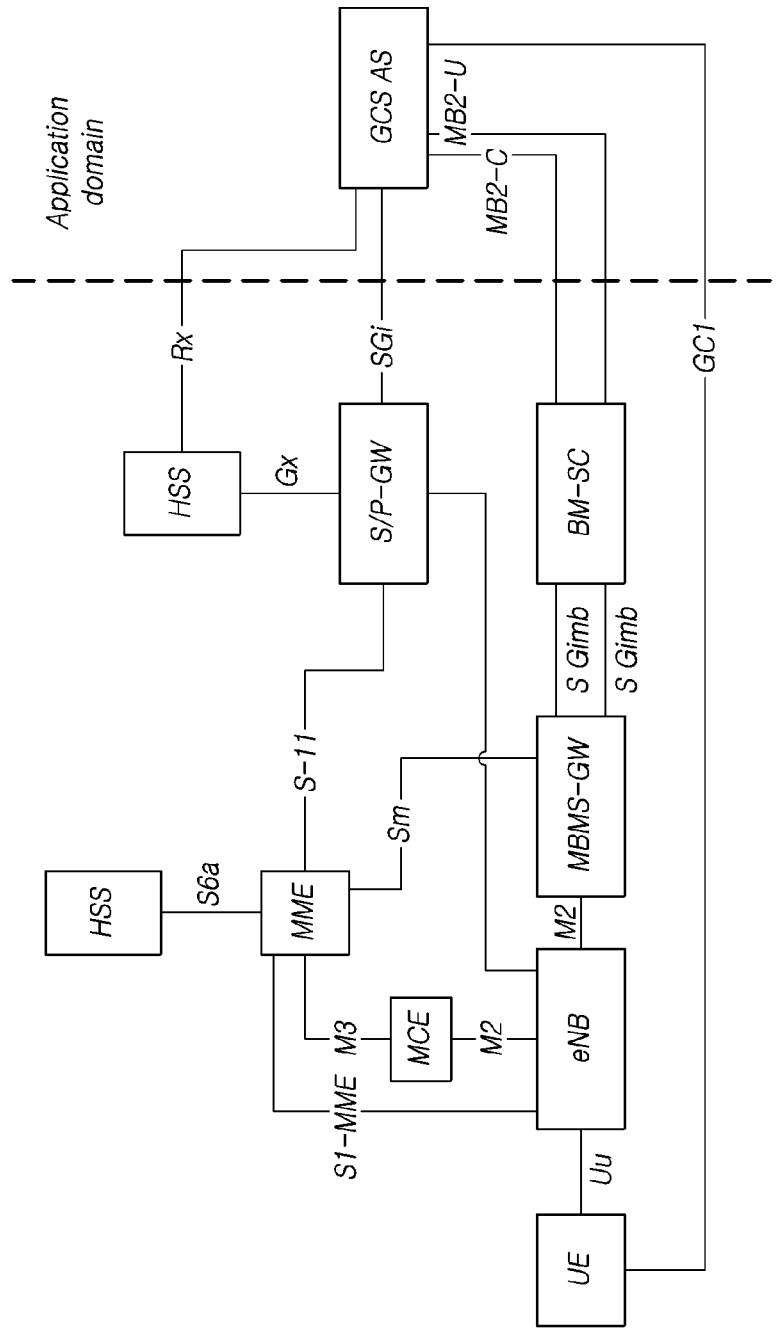
FIG. 8 is a diagram exemplarily illustrating a logical structure in multimedia broadcast multicast services (MBMS).

In order to provide the MBMS through the above-described transmission schemes, a logical structure as illustrated in FIG. 8 may be used.

FIG. 8 is a diagram illustrating a logical structure of MBMS.

Referring to FIG. 8, each entity performs the following functions.

Group Communication System Application Server (GCS AS) Entity
   The performance of signaling exchange (e.g., service announcement) related to a UE and a GCS session and group management aspect.
      The reception of uplink data from the UE through the unicast.
   The transmission of data to the UE belonging to one group using unicast transmission and/or multicast transmission.
Broadcast Multicast Service Centre (BM-SC) Entity
   operating as a source of the MBMS transmission, and starting or stopping transmission of a session for an MBMS bearer service through MBMS session control signaling.
Multimedia Broadcast Multicast Services Gateway (MBMS GW) Entity
   The sending/broadcasting of MBMS packets to each eNB transmitting the service).
   The MBMS GW uses IP Multicast as the means of forwarding MBMS user data to the eNB.
   The MBMS GW performs MBMS Session Control Signaling (Session start/update/stop) towards the E-UTRAN via MME).
Multi-Cell/Multicast Coordination Entity (MCE) Entity
   The admission control and the allocation of the radio resources used by all eNBs in the MBSFN area for multi-cell MBMS transmissions using MBSFN operation.
   The MCE decides not to establish the radio bearer(s) of the new MBMS service(s) if the radio resources are not sufficient for the corresponding MBMS service(s) or may pre-empt radio resources from other radio bearer (s) of ongoing MBMS service(s) according to ARP.
   Besides allocation of the time/frequency radio resources, this also includes deciding the further details of the radio configuration e.g., the modulation and coding scheme.
   Deciding on whether to use SC-PTM or MBSFN.
   Counting and acquisition of counting results for MBMS service(s).
   Resumption of MBMS session(s) within MBSFN area(s) based on e.g., the ARP and/or the counting results for the corresponding MBMS service(s).
   Suspension of MBMS session(s) within MBSFN area(s) based, for example, the ARP and/or on the counting results for the corresponding MBMS service(s).

Figure 9:
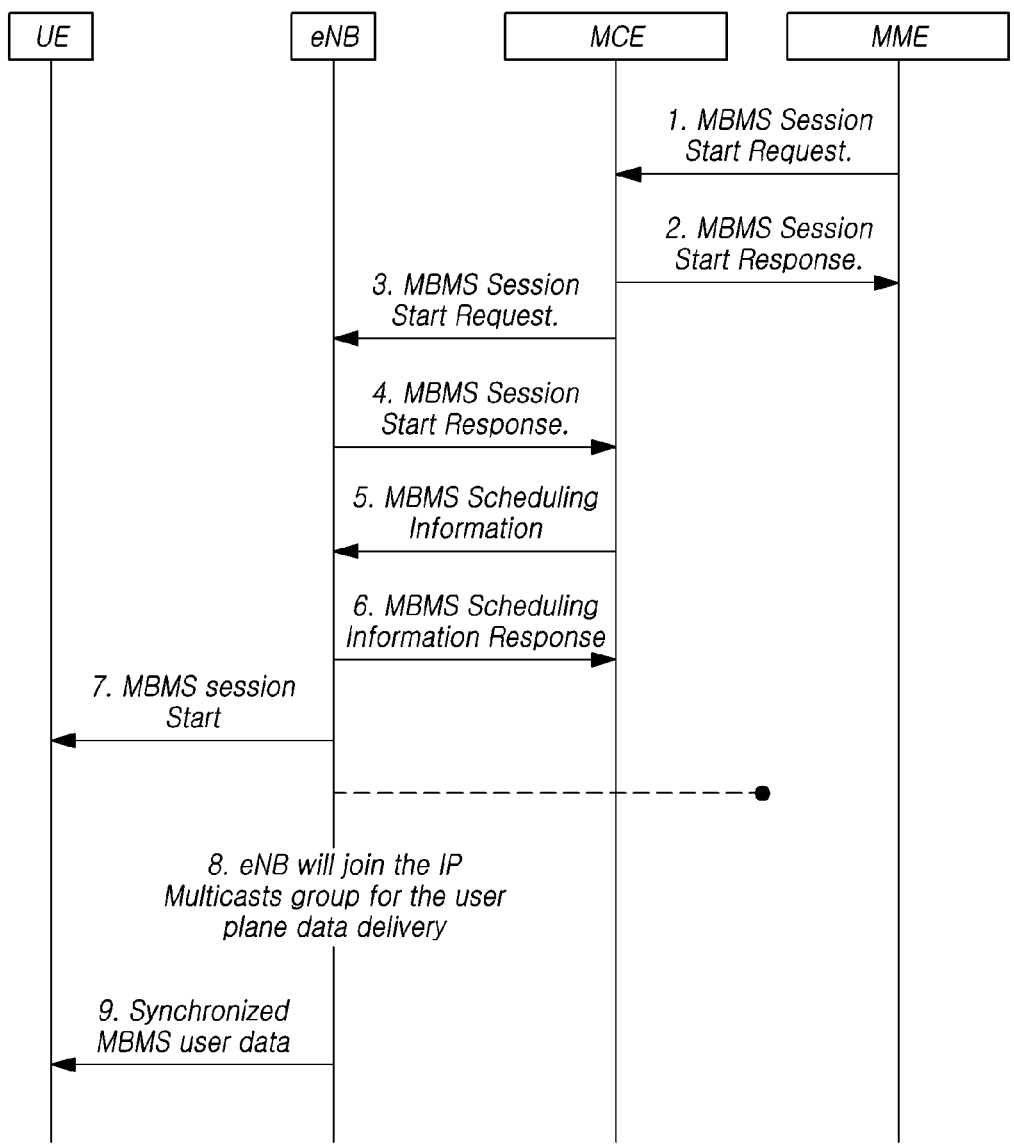
FIG. 9 is a diagram for describing a procedure for starting an MBMS session.

FIG. 9 is a diagram for describing a procedure for starting MBMS session.

Referring to FIG. 9, the MBMS session is initiated through 9 steps.

1. The MME sends an MBMS session start request message to the MCE(s) controlling eNBs in the targeted MBMS service area. The message includes an IP multicast address, session attributes, and the minimum time to wait before the first data delivery. Further, the message includes the list of cell identities if available.
2. The MCE decides whether to use SC-PTM or MBSFN to carry the MBMS bearer over the air interface.

The MCE confirms the reception of the MBMS session start request to the MME. This message may be transmitted before step 4. In an SC-PTM operation, the MCE only confirms the reception of the MBMS session start request to the MME, after the MCE receives at least one confirmation from the eNB(s) (i.e., Step 4).

3. In the SC-PTM operation, the MCE includes the SC-PTM information, in the MBMS Session Start Request message to the relevant eNBs.
4. In the SC-PTM operation, the eNB checks whether the radio resources are sufficient for the establishment of new MBMS service(s) in the area it controls. If not, eNB decides not to establish the radio bearers of the MBMS service(s), or eNB may pre-empt radio resources from other radio bearer(s) according to ARP. eNB confirms the reception of the MBMS session start message.

Steps 5 and 6 are only applicable to the MBSFN operation.

5. The MCE sends the MBMS scheduling information message to the eNB including the updated MCCH information which carries the MBMS service's configuration information. This message can be transmitted before step 3.
6. eNB confirms the reception of the MBMS scheduling information message.
7. eNB indicates a MBMS session start to UEs by MCCH change notification and updated MCCH information which carries the MBMS service's configuration information.
8. eNB joins the IP multicast group to receive the MBMS User Plane data.
9. eNB sends the MBMS data to a radio interface.

As described above, in order to provide the MBMS, a complex control procedure was required between core network entities and a wireless network. For example, a separate MCE entity for controlling a base station within a target MBMS service area needs to perform an operation of determining a transmission scheme among the MBSFN method and the SC-PTM scheme and performing scheduling.

Accordingly, it is difficult to directly dynamically turn on/off MBMS transmission for a cell linked to a specific base station. For example, even when there is only one UE for receiving data through MBMS transmission in a specific cell, data needs to be transmitted inefficiently through MBMS transmission.

As described above, it is difficult to dynamically control MBMS transmission in a specific base station or a specific cell in the related art.

In order to solve the above problems, the present disclosure introduces a method for the base station and UE to perform switching between unicast transmission and multicast transmission while minimizing service interruption for efficiently transmitting/receiving the MBS service based on NR.

Hereinafter, an MBS transmission method according to embodiments will be described based on NR access technology for convenience of description. However, the present embodiments are not limited thereto. For example, the present embodiments may be applied to any radio access technology. Meanwhile, the present embodiment includes the contents of information elements and operations specified in TS38.300 of the NR MAC standard and TS 38.331 of the NR RRC standard. Even when the contents of the UE operation related to the detailed definition of the corresponding information element are not included in the present specification, the corresponding contents specified in the above-described standard may be included and interpreted in the present disclosure.

Meanwhile, the MBS service in the present disclosure may be applied to not only a large-scale broadcast service provided through a single frequency network (SFN), but also any services such as V2X, public safety, IoT service, software upgrade, and file transmission that are provided through one or more cells.

For convenience of description, a method capable of effectively providing an MBS service without distinction between a broadcast scheme and a multicast scheme will be described below. To help understanding, the multicast transmission scheme will be mainly described. However, it may also be provided for a broadcast scheme or any MBS transmission scheme for MBS service.

In addition, in the present specification, a multicast/broadcast service based on a radio access technology is referred to and described as MBS. This is to help understanding and may be understood to mean all services in which a base station transmits data of a multicast/broadcast session to one or more UEs. That is, the MBS may be understood as having the same meaning as the above-described MBMS and should not be understood as a term for a transmission type transmitted from a base station to a UE as a term for distinguishing a service session itself.

For example, as described above, the MBS data may be transmitted by the base station through the multicast or broadcast transmission type, or the MBS data may be transmitted to individual UEs by being configured as the unicast transmission type if necessary. Accordingly, the MBS data should be understood as meaning for specifying a service indicating data characteristics. Hereinafter, it is described as the MBS, but if necessary, when indicating LTE MBMS, it is also described as MBMS.

Hereinafter, the methods provided below may be applied individually or selectively combined.

Figure 10:
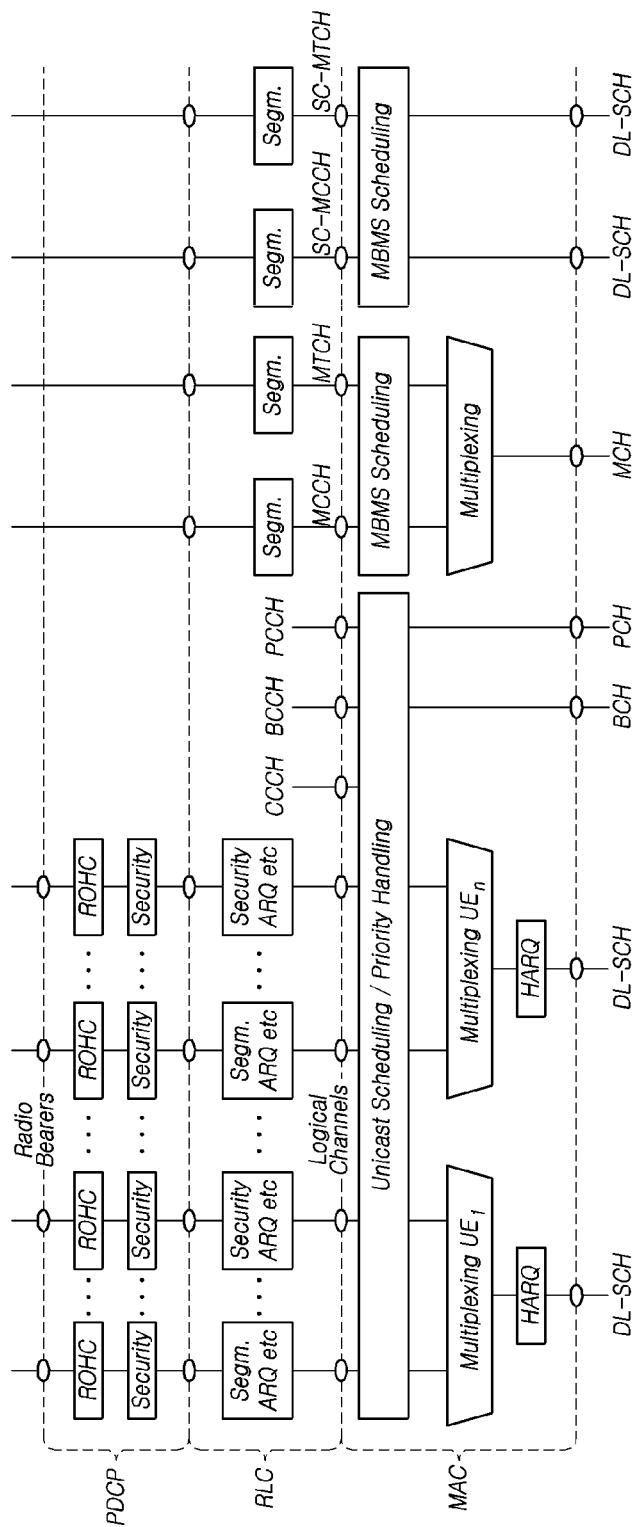
FIG. 10 is a diagram illustrating a downlink layer 2 structure in a long-term evolution (LTE) system.

FIG. 10 is a diagram illustrating a downlink layer 2 structure in an LTE system.

Referring to FIG. 10, in the typical LTE, MBMS point to multipoint radio bearer (MRB) or single cell MRB (SC-MRB) for providing MBMS transmits data based on RLC-UM providing a segmentation function without a PDCP entity.

For one or several MTCHs, a multicast control channel (MCCH) logical channel for transmitting MBMS control information from the network to the UE and a multicast traffic channel (MTCH) for user data transmission of a UE receiving MBMS (using MBSFN) are transmitted to the UE through a MCH transmission channel.

For one or several SC-MTCHs, the SC-MCCH logical channel for transmitting the MBMS control information from the network to the UE and the SC-MTCH for transmitting user data of the UE receiving the MBMS using the SC-PTM are transmitted to the UE through the DL-SCH transmission channel.

For efficient data transmission, NR may also transmit the multicast traffic channel or the multicast control channel through the DL-SCH. For convenience of description, a logical channel for transmitting MBS user data in NR is denoted as NR-MTCH, and a logical channel for transmitting MBS control information in NR is denoted as NR-MCCH. This is for convenience of description and may be replaced with any name (e.g., MTCH, MCCH, SC-MTCH, SC-MCCH, 5G-MTCH, 5G-MCCH).

A service capable of MBS transmission such as V2X, public safety, video/audio, media stream, IoT application, software upgrade, and content distribution such as file transmission may be provided in a specific cell. To this end, data for the corresponding service is transmitted in the corresponding cell and may be received by the UE(s).

When the number of UEs interested in or receiving the corresponding service in the corresponding cell is small, it is efficient to transmit data using the unicast transmission scheme (type). On the other hand, when the number of UEs interested in or receiving the corresponding service in the corresponding cell is large, it is efficient to transmit data using the multicast transmission scheme (type). In addition, when the UE is out of the corresponding cell coverage according to the movement of the UE, the number of UEs receiving the corresponding service is reduced. Alternatively, when the radio quality of the UE is poor and when reception is difficult using the multicast transmission scheme, the corresponding UE may be excluded from the number of UEs interested in or receiving the corresponding service in the corresponding cell. As such, for the service capable of MBS transmission, the base station (or any radio network entity) may transmit data by selecting a method of efficiently transmitting data for the corresponding service in a specific cell. Accordingly, it is necessary to dynamically switch the transmission method according to the related condition change. For example, the base station may change from the unicast transmission scheme to the multicast transmission scheme or change from the multicast transmission scheme to the unicast transmission scheme for the corresponding service in a specific cell.

The present disclosure introduces a base station and a UE procedure for providing such an operation of dynamically switching a transmission method.

Figure 11:
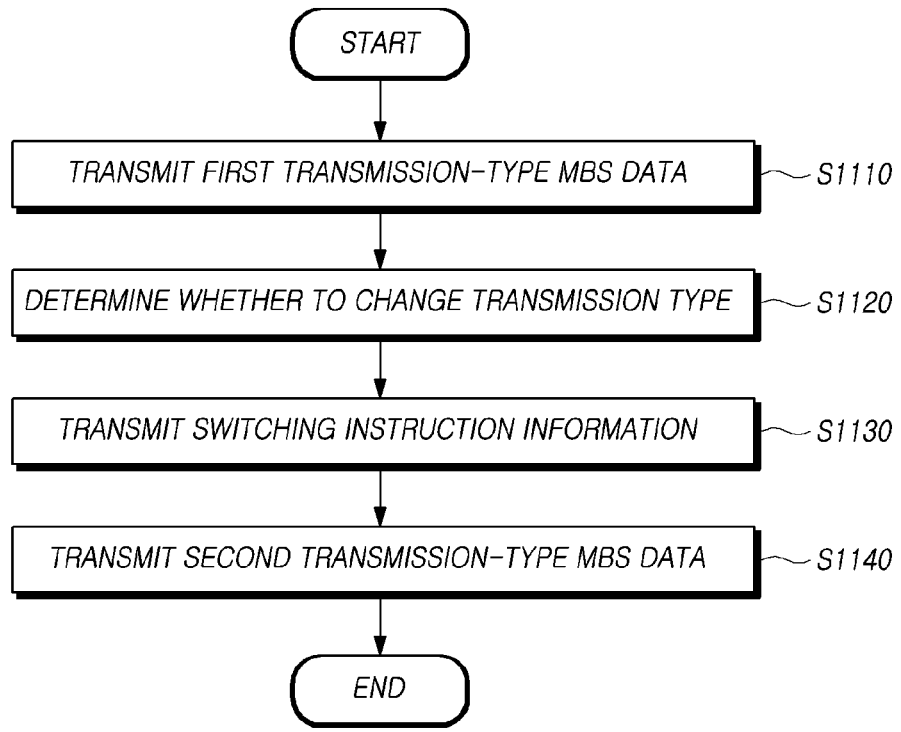
FIG. 11 is a flowchart for describing operations of a base station according to an embodiment.

FIG. 11 is a flowchart for describing operations of a base station according to an embodiment.

Referring to FIG. 11, a method of switching MBS data transmission by a base station may include transmitting MBS data to a UE according to a first transmission type (S1110).

The base station may receive a session start request message for an MBS service session from a core network control plane entity. Upon receiving the session start request message, the base station determines a transmission type for MBS data transmission. For example, the base station may determine the first transmission type by using the number of UEs in a cell interested in the corresponding MBS session. The base station may transmit the MBS data to the UE in the determined first transmission type.

Here, when the first transmission type is the unicast transmission type, the second transmission type may be a multicast or broadcast transmission type. Similarly, when the second transmission type is the multicast or broadcast transmission type, the first transmission type may be a unicast transmission type.

In addition, the method of switching MBS data transmission by a base station may include determining whether to change the first transmission type that is transmitting the MBS data (S1120).

For example, the base station may determine whether it is necessary to change the transmission type for the MBS data being transmitted in the first transmission type. For example, the base station may determine whether to change the transmission type in consideration of assistance information received from the UE, feedback information on the corresponding MBS data, reception status information of the UE, radio resource state information, and the like.

In addition, the method of switching MBS data transmission by a base station may include transmitting switching instruction information to the UE when it is determined the base station changes the first transmission type to the second transmission type (S1130).

For example, when it is determined that the base station changes the transmission type, the base station may transmit the switching instruction information instructing the transmission type change to the UE.

For example, the switching instruction information may be transmitted while being included in at least one of an RRC message, system information, and control information associated with the MBS data transmission.

As another example, the base station may further transmit radio bearer information for receiving MBS data or session information associated with the MBS data together with the switching instruction information or according to a sequentially changed transmission type.

As another example, the base station may further transmit information for configuring the RLC entity of the UE by linking the RLC entity of the UE to the RNTI for identifying the traffic channel according to the changed second transmission type of the UE. For example, the corresponding information may be NR-G-RNTI.

Upon receiving the switching instruction information and the above-described additional information, the UE processes the configuration within the UE for receiving the MBS data in the second transmission type. For example, in order to receive the MBS data in the second transmission type, the UE may establish/reestablish/reconfigure/configure the related radio bearer, RLC, or PDCP configuration within the UE.

For example, when the second transmission type is the multicast or broadcast transmission type, the UE may configure or reconfigure a PDCP entity associated with a radio bearer for processing the MBS data through the multicast or broadcast transmission type.

As another example, when the first transmission type is the multicast or broadcast transmission type, the UE may use the first transmission type to configure or reconfigure the PDCP entity associated with the radio bearer for processing the MBS data through the multicast or broadcast transmission type before receiving the MBS data.

As another example, the UE may reconfigure the related RLC entity according to the unicast or multicast/broadcast transmission type.

Meanwhile, the method of switching MBS data transmission by a base station may include transmitting the MBS data in the second transmission type (S1140).

The base station may change the MBS data to the second transmission type indicated by the switching instruction information and transmit the MBS data.

For example, the base station may determine a packet data convergence protocol serial data unit (PDCP SDU) for transmission of the MBS data in the second transmission type based on the PDCP status report information received from the UE in order to prevent the continuity and omission of data when transmitting the MBS data by changing the transmission type.

For example, when the first transmission type is the unicast transmission type and the second transmission type is the multicast/broadcast transmission type, the base station may transmit a PDCP SDU having an earliest or lowest sequence number (SN) among packet data convergence protocol serial data unit sequence numbers (PDCP SNs) or radio link control sequence numbers (RLC SNs) of a plurality of UEs that have received MBS data in the first transmission type.

As another example, when the first transmission type is the multicast/broadcast transmission type and the second transmission type is the unicast transmission type, the base station may transmit the PDCP SDU for each UE in the second transmission type in consideration of the PDCP SN or RLC SN for each UE that is receiving the MBS data in the first transmission type.

As another example, the base station may receive the PDCP status report information from the UE for normal transmission of the PDCP SDU according to the change of the transmission type.

Through the operation described above, the base station may dynamically change the transmission type of the MBS data and control seamless MBS data transmission to be maintained even when the transmission type is changed.

Figure 12:
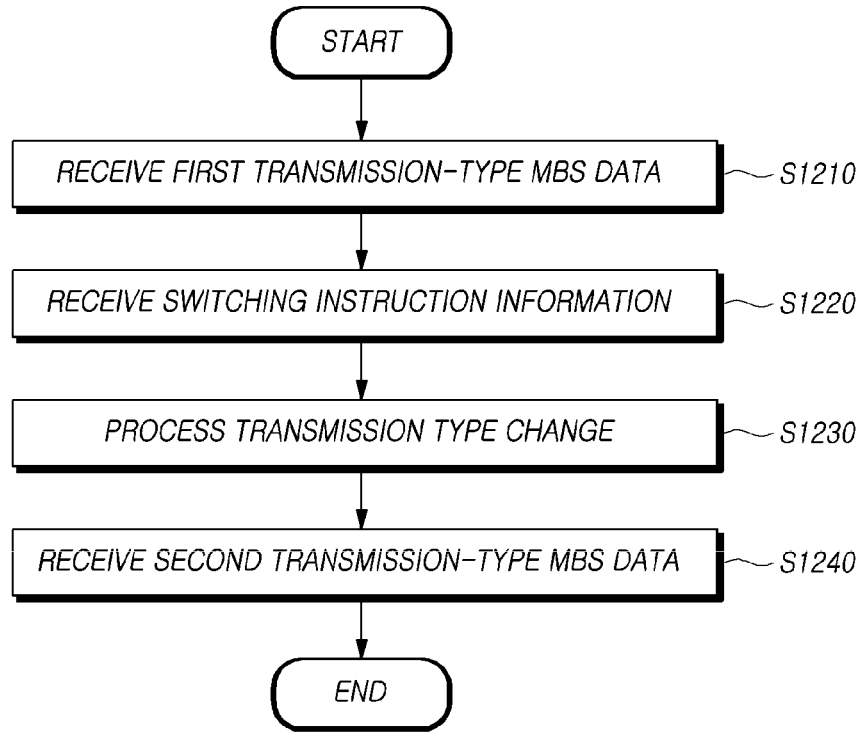
FIG. 12 is a flowchart for describing operations of a user equipment (UE) according to an embodiment.

FIG. 12 is a flowchart for describing operations of a UE according to an embodiment.

Referring to FIG. 12, a method of switching multicast/broadcast service (MBS) data reception by a UE may include receiving the MBS data from a base station according to the first transmission type (S1210).

For example, the base station may receive a session start request message for an MBS service session from a core network control plane entity. Upon receiving the session start request message, the base station determines a transmission type for MBS data transmission. For example, the base station may determine the first transmission type by using the number of UEs in a cell interested in the corresponding MBS session. The UE may receive the MBS data in the first transmission type determined by the base station.

Alternatively, the UE may transmit information on an MBS of interest to the base station. Thus, the base station may use the information to determine a transmission type.

In addition, the method of switching MBS data reception by a UE may include receiving the switching instruction information from the base station when it is determined that the base station changes the first transmission type to the second transmission type (S1220).

For example, when the first transmission type is the unicast transmission type, the second transmission type may be the multicast or broadcast transmission type. Similarly, when the second transmission type is the multicast or broadcast transmission type, the first transmission type may be the unicast transmission type.

For example, the base station may determine whether it is necessary to change the transmission type of the MBS data being transmitted in the first transmission type. For example, the base station may determine whether to change the transmission type in consideration of assistance information received from the UE, feedback information on the corresponding MBS data, reception state information of the UE, radio resource state information, and the like. To this end, the UE may transmit at least one of the assistance information, the feedback information on the MBS data reception, the reception status information of the UE, and the radio resource status information to the base station.

Meanwhile, the UE may receive switching instruction information.

For example, the switching instruction information may be received while being included in at least one of an RRC message, system information, and control information associated with the MBS data transmission.

As another example, the UE may further receive radio bearer information for receiving MBS data or session information associated with the MBS data together with the switching instruction information or according to a sequentially changed transmission type.

As another example, the UE may further receive information for configuring the RLC entity of the UE by associating the RLC entity of the UE with the RNTI for identifying the traffic channel changed according to the second transmission type of the UE. For example, the corresponding information may be NR-G-RNTI.

The method of switching MBS data reception by a UE may include performing a process for receiving the MBS data in the second transmission type based on the switching instruction information (S1230).

Upon receiving the switching instruction information and the above-described additional information, the UE processes the configuration within the UE for receiving the MBS data in the second transmission type. For example, in order to receive the MBS data in the second transmission type, the UE may establish/reestablish/reconfigure/configure the related radio bearer, RLC, or PDCP configuration within the UE.

For example, when the second transmission type is the multicast or broadcast transmission type, the UE may configure or reconfigure a PDCP entity associated with a radio bearer for processing the MBS data through the multicast or broadcast transmission type.

As another example, when the first transmission type is the multicast or broadcast transmission type, the UE may use the first transmission type to configure or reconfigure the PDCP entity associated with the radio bearer for processing the MBS data through the multicast or broadcast transmission type before receiving the MBS data.

As another example, the UE may reconfigure the related RLC entity according to the unicast or multicast/broadcast transmission type.

The method of switching MBS data reception by a UE may include receiving the MBS data in the second transmission type (S1240).

The UE may receive the MBS data in the second transmission type indicated by the switching instruction information.

For example, the base station may determine the PDCP SDU for transmission in the second transmission type based on the PDCP status report information received from the UE in order to prevent the continuity and omission of data when transmitting the MBS data by changing the transmission type.

For example, when the first transmission type is the unicast transmission type and the second transmission type is the multicast/broadcast transmission type, the base station may transmit a PDCP SDU having an earliest or lowest sequence number (SN) among packet data convergence protocol serial data unit sequence numbers (PDCP SNs) or radio link control sequence numbers (RLC SNs) of a plurality of UEs that have received MBS data in the first transmission type.

As another example, when the first transmission type is the multicast/broadcast transmission type and the second transmission type is the unicast transmission type, the base station may transmit the PDCP SDU for each UE in the second transmission type in consideration of the PDCP SN or RLC SN for each UE that is receiving the MBS data in the first transmission type.

As another example, prior to the receiving of the MBS data in the second transmission type, the UE may further perform an operation of transmitting the PDCP status report information for the MBS data received in the first transmission type to the base station. Accordingly, the MBS data received in the second transmission type may be the PDCP SDU determined based on the PDCP status report information.

Through the operation described above, the UE may receive the MBS data without interruption or omission even when the transmission type for the MBS data is dynamically changed.

Hereinafter, more detailed embodiments for each operation of the above-described base station and UE will be described. Each of the embodiments described below may be performed by the base station or the UE in any combination. In addition, in order to perform each of the embodiments below, at least one of operations may be added to, modified, or deleted from the above-described methods.

Embodiment of Procedure for Switching Transmission Type from Unicast to Multicast/Broadcast in One Cell This embodiment will be described with an assumption that the first transmission type is the unicast transmission type and the second transmission type is the multicast/broadcast transmission type.

The base station may receive a session start request message for a specific MBS service session through a core network control plane entity (e.g., AMF). The session start request message may include one or more of identification information (e.g., temporary mobile group identity (TMGI), session-ID) for the corresponding MBS service session, QoS information (e.g., one or more pieces of information of 5G QoS ID (5QI)/QoS class ID (QCI), QoS flow ID, guaranteed bit rate (GBR) QoS flow information (maximum flow bit rate, guaranteed flow bit rate, maximum packet loss rate), allocation and retention priority (ARQ), priority level, packet delay budget, and packet error rate), resource setup request transmission information (e.g., one or more pieces of information of multicast IP address (destination IP), MBMS GW internet protocol (IP) address (source IP) or user plane function (UPF) endpoint information (IP address, general packet radio service (GPRS) tunneling protocol tunnel endpoint ID (GTP-TEID)) for the MBMS service session, and the number of UEs interested in the corresponding service session (or requesting the corresponding service or receiving the corresponding service) in the associated cell.

The base station may transmit data for the corresponding service session by selecting the unicast transmission or multicast (broadcast) transmission in the associated cell of the corresponding base station. The base station may select a transmission scheme in consideration of the number of UEs interested in or receiving the corresponding service in the corresponding cell. To this end, the RRC connected state UE may transmit information indicating interest in the corresponding service session to the base station through the RRC signaling such as UE assistance information. Alternatively, the UE may indicate (e.g., inform or provide) the reception state to the base station by periodically reporting the feedback information on the corresponding service session through any L2 signaling or L1 signaling. The base station may configure information (e.g., period, resource, reporting granularity (e.g., session/bearer), information for identifying the same) for instructing the UE to transmit the above-described assistance information or feedback information.

The base station may transmit data for the corresponding service session by selecting the unicast transmission or multicast transmission in the associated cell of the corresponding base station. The base station may determine switching between the unicast transmission and the multicast transmission in consideration of the information received from the UE (or from the core network), the radio resource status, and the like, and instruct the UE to switch between the unicast transmission and the multicast transmission.

First, the procedure for switching from unicast to multicast will be described.

The base station determines the unicast transmission scheme for the corresponding service session and instructs a radio bearer (DRB) configuration of the unicast scheme for the corresponding service session through an RRC reconfiguration message. For example, the corresponding RRC message or radio bearer configuration information (DRB-ToAddMod) or RLC bearer configuration information (RLC-BearerConfig) included therein may include identification information (e.g., TMGI, session-ID) for the corresponding service session. The identification information for the corresponding service session may include one or more pieces of information of the TMGI for identifying the MBMS session, an MBS-sessionID for identifying a session-ID and an MBS session, and a protocol data unit (PDU) session ID for identifying a (unicast) PDU session associated/mapped with the MBMS/MBS session. Accordingly, the UE may receive data by linking the corresponding service session data to the radio bearer or the RLC bearer.

Upon receiving the RRC reconfiguration message (or unicast switching instruction information) of the unicast scheme, the UE configures or reconfigures the DRB.

The UE notifies the higher layer of the unicast DRB configuration for the corresponding service session (TMGI, session-ID, MBS-sessionID, MBS-PDU-sessionID).

The base station transmits data for the corresponding service session to one or more UEs in the unicast scheme through each data radio bearer. For convenience of description, it is assumed that three UEs (e.g., UE1, UE2, and UE3) receive the corresponding service data through DRBs (e.g., DRB of UE1, DRB of UE2, DRB of UE3), respectively.

The base station determines the switching/change/modification/reconfiguration of the transmission scheme from the unicast to the multicast and instructs the determined switching/change/modification/reconfiguration to the UE. For convenience of description, this is indicated as the switching instruction. This is for convenience of description and may be replaced with any other terms or names, such as a switching/change/modification command, and a transmission mode/cast change.

The base station may use a dedicated RRC message (e.g., RRC reconfiguration) to instruct switching to the UE receiving the corresponding service data through the unicast transmission. For example, the base station may instruct switching by transmitting the dedicated RRC message to each of the three UEs described above. The corresponding RRC message may further include one or more of the switching instruction information, the MRB configuration information for receiving data according to the switched transmission scheme, and the associated service session information. An MBS Radio Bearer (MRB) in the present specification refers to a radio bearer associated with an MBS session or a radio bearer for MBS session data transmission. This is only for convenience of description and may be replaced with any other term.

Alternatively, the base station may instruct switching through system information (or arbitrary system information) necessary to obtain control information (e.g., NR-MCCH) associated with MBS transmission using NR multicast. The corresponding system information may further include one or more of the switching instruction information, the MRB configuration information for receiving data according to the switched transmission scheme, and the associated service session information.

Alternatively, the base station may instruct switching through control information (e.g., NR-MCCH) associated with MBS transmission using NR multicast. The corresponding information may further include one or more of the switching instruction information, the MRB configuration information for receiving data according to the switched transmission scheme, and the associated service session information.

Upon receiving the above-described switching instruction information and/or MRB configuration information, the UE may establish the MRB. As an example, establishing/configuring/reconfiguring the MRB without an L2 entity above the RLC in UE will be described.

For example, the UE may establish an RLC entity for the MRB.

The NR RRC reconfiguration message defines an RLC bearer for a unicast radio bearer and includes the RLC bearer configuration information as a detailed information element of the cell group configuration information. Therefore, when the NR-MRB is established without the L2 entity above the RLC, the RLC entity (entity) may be established by defining RLC bearer configuration information (RLC-BearerConfig) for the NR-MRB. The corresponding RLC entity may be configured by being associated with an RNTI. RNTI is used to scramble the NR-MTCH scheduling and transmission to identify the transmission of the NR-MTCH for the corresponding session, and RNTI is indicated as NR-G-RNTI for convenience of description. This may be an RNTI for identifying a traffic channel changed according to the above-described second transmission type.

As another example, the UE may reconfigure the RLC entity included in the DRB of the unicast transmission scheme into an RLC entity for the NR-MRB.

The NR RRC reconfiguration message identifies the RLC entity by associating the RLC bearer with a logical channel ID (logicalChannelIdentity) for the unicast radio bearer associated with the MBS session. Therefore, in order to reconfigure the RLC entity included in the DRB of the unicast transmission scheme into the RLC entity for the NR-MRB, the NR RRC reconfiguration message may also include information for associating the identification information (e.g., TMGI, session-ID) or the NR-G-RNTI for the corresponding service session with the logical channel ID (logicalChannelIdentity) for the unicast radio bearer. For example, such information may be included in RLC bearer configuration information (RLC-BearerConfig).

The UE establishes/reestablishes or reconfigures the RLC entity. In this case, the RLC entity may be established/reestablished or reconfigured according to the received RLC configuration information (rlc-Config).

The UE configures an applicable NR-MTCH logical channel for the corresponding MRB. For the corresponding service, the UE instructs the MAC to receive the DL-SCH using information (e.g., NR-G-RNTI, NR-MTCH scheduling information) included in the NR-MCCH message.

The UE constitutes a physical layer.

The UE notifies the higher layer of the MRB establishment/reconfiguration for the corresponding service session (TMGI, session-ID).

Through the above operation, the UE changes the transmission scheme from the unicast transmission scheme to the multicast transmission scheme.

Meanwhile, the following operation may be additionally performed to support lossless transmission or to efficiently transmit data. The corresponding operation may be performed together with the MRB establishment/reconfiguration or performed at a previous point in time or may be performed at a later point in time.

An RLC entity of a UE unicast radio bearer may transmit a status report to the base station. For example, an acknowledged mode radio link control (AM RLC) entity may transmit a status PDU including an acknowledged sequence number (acknowledged SN) field, a negative acknowledgement sequence number (negative acknowledgment SN) field, a segment offset (SO) start field, and an SO end field to the base station. As another example, an unacknowledged mode radio link control (UM RLC) entity may transmit a status PDU including an SN field of the last received unacknowledged mode data protocol data unit (UMD PDU) and an SO field of the corresponding PDU to the base station. The status PDU of the UM RLC entity may be distinguished from the status PDU of the AM RLC entity through a different control PDU type field value. Alternatively, a field for distinguishing these status PDUs may be included in the status PDU.

The base station transmits the corresponding service data being transmitted through the unicast bearer through the multicast bearer. Alternatively, the base station may retransmit unacknowledged data through the unicast bearer. Alternatively, the base station may transmit data after the data transmitted through the unicast bearer.

The base station may consider an SN state of the unicast bearer for efficient transmission. For example, the base station may consider a downlink RLC SN transmission state. This may be the next RLC SN to be allocated to a new SDU without the base station having an RLC SN yet. When the base station is transmitting the corresponding service data to one or more UEs in the corresponding cell through the unicast bearer and when the base station transmits the corresponding service data through the multicast bearer, the base station may first transmit an RLC SDU having the earliest (earliest) or lowest SN among the RLC SNs of the corresponding UEs. Alternatively, when there is a missing RLC SDU, the base station may first transmit the RLC SDU having the earliest or lowest SN among the first missing RLC SDUs of the corresponding UEs. Alternatively, when there is an unacknowledged RLC SDU, the base station may first transmit the RLC SDU having the earliest or lowest SN among the first missing RLC SDUs of the corresponding UEs.

The base station may consider the status report received from the UE when transmitting the corresponding service data being transmitted through the unicast bearer through the multicast bearer. For example, the UE may transmit the corresponding service data through the multicast bearer from the next RLC SN of the last SN (or the last received SN) sequentially received. As another example, the RLC SDU having the SN detected as being lost in the UE may be transmitted/retransmitted through the multicast bearer.

The UE may receive data through the switched MRB.

The UE may release the unicast DRB for the corresponding service.

The UE notifies the higher layer of the unicast DRB release for the corresponding service session (TMGI, session-ID).

The above-described embodiments may be equally applied to the case of configuring the MRB including the L2 entity above the RLC.

Embodiment of Procedure for Switching from Multicast (Broadcast) Transmission Type to Unicast Transmission Type within One Cell This embodiment will be described with an assumption that the above-described first transmission type is multicast or broadcast and the second transmission type is unicast.

For example, this embodiment will be described when the UE establishes the MRB without the L2 entity above the RLC.

The UE may establish the RLC entity for the MRB.

The NR RRC reconfiguration message defines the RLC bearer for the unicast radio bearer and includes the RLC bearer configuration information as a detailed information element of the cell group configuration information. Therefore, when the NR-MRB is established without the L2 entity above the RLC, the RLC entity may be established by defining the RLC bearer configuration information for the NR-MRB. The corresponding RLC entity may be configured by being associated with the NR-G-RNTI for identifying the transmission of the NR-MTCH for the corresponding session.

The UE establishes/reestablishes the RLC entity. In this case, the RLC entity may be established/reestablished or reconfigured according to the received RLC configuration information (rlc-Config).

The UE configures an applicable NR-MTCH logical channel for the corresponding MRB. For the corresponding service, the UE instructs the MAC to receive the DL-SCH using information (e.g., NR-G-RNTI, NR-MTCH scheduling information) included in the NR-MCCH message.

The UE constitutes a physical layer.

The UE notifies the higher layer of the MRB establishment for the corresponding service session (TMGI, session-ID).

The base station determines the switching/change/modification/reconfiguration of the transmission scheme from the multicast to the unicast and instructs the determined switching/change/modification/reconfiguration to the UE.

The base station may use the dedicated RRC message (e.g., RRC reconfiguration) to instruct switching to the UE receiving the corresponding service data through the multicast transmission. In the above-described example, the base station may instruct switching by transmitting the dedicated RRC message to each of the three UEs. The corresponding RRC message may further include one or more of the switching instruction information, the unicast DRB configuration information for receiving data according to the switched transmission scheme, and the associated service session information.

Alternatively, the base station may instruct switching through the system information (or arbitrary system information) necessary to obtain the control information (e.g., NR-MCCH) associated with the MBS transmission using the NR multicast. The corresponding system information may further include one or more of the switching instruction information, the unicast DRB configuration information for receiving data according to the switched transmission scheme, and the associated service session information.

Alternatively, the base station may instruct switching through the control information (e.g., NR-MCCH) associated with the MBS transmission using the NR multicast. The corresponding control information may further include one or more of the switching instruction information, the unicast DRB configuration information for receiving data according to the switched transmission scheme, and the associated service session information.

Upon receiving the above-described switching instruction information and/or unicast DRB configuration information, the UE may establish or reconfigure the DRB.

The corresponding RRC message or radio bearer configuration information or RLC bearer configuration information included in the corresponding RRC message may include identification information (e.g. TMGI, session-ID) for the corresponding service session. The identification information for the corresponding service session may include one or more pieces of information of the TMGI for identifying the MBMS session, the MBS-sessionID for identifying the session-ID and the MBS session, and the PDU session ID for identifying the (unicast) PDU session associated/mapped with the MBMS/MBS session. Accordingly, the UE may receive data by linking the corresponding service session data to the radio bearer or the RLC bearer.

The UE configures the DRB.

The UE notifies the higher layer of the unicast DRB establishment for the corresponding service session (TMGI, session-ID).

The base station transmits data for the corresponding service session to one or more UEs in the unicast scheme through each data radio bearer.

For example, the UE may establish the RLC entity for the unicast DRB.

The corresponding RLC entity may be configured by being associated with the NR-G-RNTI for identifying the transmission of the NR-MTCH for the corresponding session. Accordingly, the UE may receive the RLC SDU previously transmitted in multicast through the RLC entity.

As another example, the UE may reconfigure the RLC entity for the NR-MRB as the DRB of the unicast transmission scheme.

The NR RRC reconfiguration message identifies the RLC entity by associating the RLC bearer with the logical channel ID (logicalChannelIdentity) for the unicast radio bearer associated with the MBS session. Therefore, in order to reconfigure the RLC entity for the NR-MRB into the RLC entity included in the DRB of the unicast transmission scheme, the base station may indicate the identification information (e.g., TMGI, session-ID) or the NR-G-RNTI for the corresponding service session together with the information for associating the identification information (e.g., TMGI, session-ID) or the NR-G-RNTI for the corresponding service session with the logical channel ID (logicalChannelIdentity) for the unicast radio bearer. Accordingly, the identification information (e.g., TMGI, session-ID) or the NR-G-RNTI for the corresponding service session may be associated with the logical channel ID or RLC radio bearer.

The UE establishes/reestablishes or reconfigures the RLC entity. In this case, the RLC entity may be established/reestablished or reconfigured according to the received RLC configuration information (rlc-Config).

The UE may configure the MAC entity according to the received logical channel configuration information (mac-LogicalChannelConfig).

The UE may configure an applicable NR-MTCH logical channel for the corresponding DRB. For the corresponding service, the UE instructs the MAC to receive the DL-SCH using information (e.g., NR-G-RNTI, NR-MTCH scheduling information) included in the NR-MCCH message. Alternatively, the UE instructs the MAC to receive the DL-SCH by using the C-RNTI of the UE.

The UE constitutes a physical layer.

The UE notifies the higher layer of the DRB establishment for the corresponding service session (e.g., TMGI, session-ID).

Meanwhile, the following operation may be additionally performed to support lossless transmission or to efficiently transmit data. The corresponding operation may be performed together with the DRB establishment/reconfiguration, or the corresponding operation may be performed at a previous point in time or may be performed at a later point in time.

The RLC entity of the MRB of the UE unicast radio bearer may transmit a status report to the base station. For example, the AM RLC entity may transmit the status PDU including the acknowledged SN field, the negative acknowledgment SN field, the SO start field, and the SO end field to the base station. As another example, the UM RLC entity may transmit the status PDU including the SN field of the last received UMD PDU and the SO field of the corresponding PDU to the base station. The status PDU of the UM RLC entity may be distinguished from the status PDU of the AM RLC entity through a different control PDU type field value. Alternatively, a field for distinguishing these status PDUs may be included in the status PDU.

In this specification, the RLC status report has been described as an example of the status report transmitted by the UE to the base station, which may be equally applied to even the case where the PDCP status report from the PDCP entity is transmitted to the base station. The same part described as the RLC SDU is equally applied to the case of PDCP SDU.

The base station transmits the corresponding service data being transmitted through the multicast bearer through the unicast DRB. Alternatively, unacknowledged data may be retransmitted through the multicast bearer. Alternatively, the base station may transmit data after the data transmitted through the multicast bearer.

The base station may consider the SN state of the multicast bearer for efficient transmission. For example, the base station may consider the downlink RLC SN transmission state. This may be the next RLC SN to be allocated to a new SDU without the base station having an RLC SN yet. The base station may consider the status report received from the UE when transmitting the corresponding service data being transmitted through the multicast bearer through the unicast bearer. For example, the UE may transmit the corresponding service data through the unicast DRB from the next RLC SN of the last SN (or the last received SN) sequentially received. As another example, the RLC SDU having the SN detected as being lost in the UE may be transmitted through the unicast DRB.

The UE may receive data through the DRB.

The UE may release the MRB for the corresponding service.

The UE notifies the higher layer of the MRB release for the corresponding service session (e.g., TMGI, session-ID).

The above-described embodiments may be equally applied to the case of configuring the MRB including the L2 entity above the RLC.

Hereinafter, embodiments of the processing operation when the UE switches the MBS data will be described.

Embodiment of Switching Using L2 Entity Above the RLC

A method of configuring, by a UE, an MRB by adding an L2 entity above RLC will be described. For convenience of description, this method will be described based on processing by adding a PDCP entity. This is only for convenience of description, the embodiment is not limited thereto. For example, the embodiment may be equally applied when an MRB is configured by adaptation SDAP or an L2 entity. For example, the MRB may be established using PDCP and SDAP above the RLC, such as an NR bearer according to the present embodiment.

As described above, when a wireless network/base station provides dynamic switching between a unicast transmission scheme and a multicast transmission scheme for a specific MBS service session, it may be desirable to provide service continuity. For example, when the switching is performed, there may be a case where lossless transmission is desirable for the corresponding service session. In order to perform the service session, it is preferable to acknowledge the reception status using the sequence number and to perform retransmission for unacknowledged data. To this end, the PDCP entity may be added to the MRB as well. Even when loss is allowed, data may be transmitted sequentially using a PDCP sequence number by adding the PDCP entity.

Figure 13:
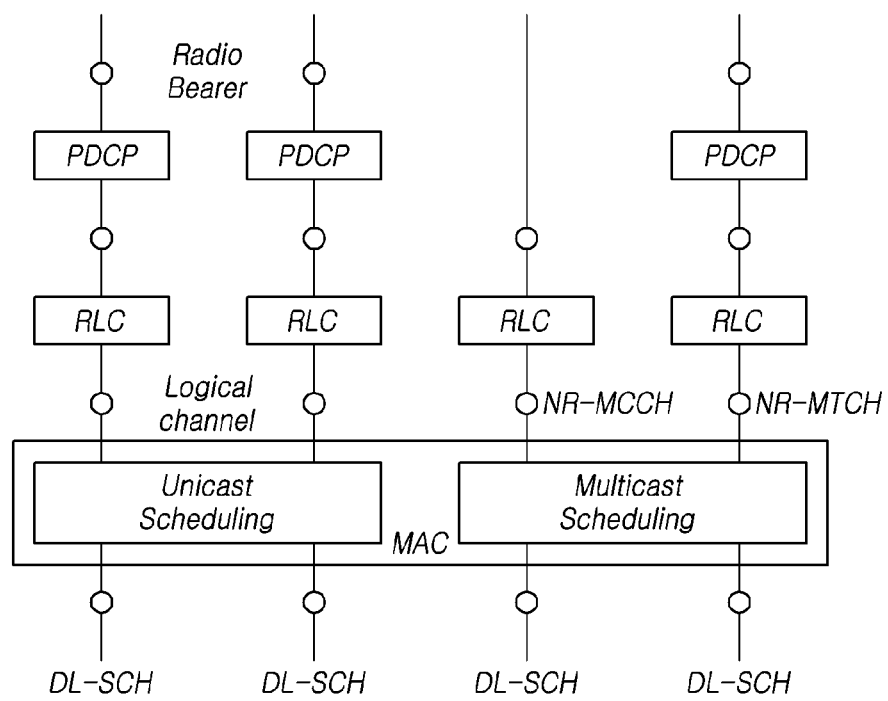
FIG. 13 is a diagram illustrating a layer 2 structure for new radio multicast/broadcast service (NR MBS) data transmission/reception according to an embodiment.

FIG. 13 is a diagram illustrating a layer 2 structure for NR MBS data transmission/reception according to an embodiment.

Referring to FIG. 13, an MRB for transmitting user data (NR-MTCH) for an MBS service session may include an associated PDCP entity. A radio bearer for transmitting control data (NR-MCCH) for an MBS service session may be configured without including a PDCP entity. Alternatively, a radio bearer for transmitting control data (NR-MCCH) for an MBS service session may also include the PDCP entity. For convenience of description, the layer 2 structure according to an embodiment will be described based on the PDCP entity configured by being associated with the NR-MTCH. However, the present embodiment is not limited thereto. For example, the present embodiment may be applied similarly to the NR-MCCH.

The MRB for transmitting MBS service session user data may be transmitted by adding PDCP configuration information/association information (or PDCP-related configuration information or some PDCP parameters). The corresponding PDCP configuration information/association information may include one or more parameters included in the PDCP configuration used for the unicast DRB as detailed information elements. Accordingly, one or more of the NR PDCP functions may be operated. For example, the PDCP configuration information/association information may include information (reestablishPDCP) for indicating PDCP reestablishment. The base station may instruct PDCP reestablishment by setting the corresponding information to true. As another example, the PDCP configuration information/association information may include information (recoverPDCP) for indicating PDCP recovery. The base station may instruct the PDCP recovery by setting the corresponding information to true. As another example, the PDCP configuration information/association information may include information (statusReportRequired) for instructing to transmit a PDCP status report. The base station may instruct the transmission of the PDCP status report by setting the corresponding information to true.

The PDCP configuration information/association information may be configured for each NR-MTCH. Accordingly, the UE may configure the PDCP entity in association with MBS session information. The MBS session information divided for each NR-MTCH may be transmitted to the UE in association with the PDCP configuration information/association information. The MBS session information indicates an ongoing MBS session within one NR-MTCH, and the MBS session information may be identified through the TMGI and optionally the session ID (sessionId). The MBS session information may include one or more pieces of information of the TMGI for identifying the MBMS session, the MBS-sessionID for identifying the session-ID and the MBS session, and the PDU session ID for identifying the (unicast) PDU session associated/mapped with the MBMS/MBS session. Accordingly, the UE may receive data by associating the corresponding service session data with the PDCP entity.

Alternatively, the NR-MTCH information may include both the MBS session information and the PDCP configuration information as lower detailed information elements.

Alternatively, a default value (or a PDCP configuration having a specific value for each PDCP parameter) for the PDCP configuration for the NR-MTCH may be predefined and used. Accordingly, the UE may configure and use the PDCP entity without separately including the PDCP configuration information (or including only a value/index/ID for identifying a specific PDCP configuration set or only a specific PDCP parameter value).

Alternatively, the NR-MTCH information may include the MBS session information and the information for identifying/associating the corresponding PDCP entity as the lower detailed information element. The information for identifying/associating the PDCP entity may be defined as a new information element for indicating the identification/association information on the PDCP entity supporting redundant transmission. Alternatively, when the MBS session is configured to be provided by the PDU session (or unicast IP transmission/tunneling transmission/UDP session or PDU session associated with the MBS session between an MBS core network server/entity (e.g., broadcast multicast service centre (BM-SC), MBS function, MBS UPF) and a base station), the information for identifying/associating the PDCP entity may indicate the PDU session identification information (or IP session identification information/tunneling identification information/UDP session identification information). Alternatively, the information for identifying/associating the PDCP entity may define and use MRB-Identity for identifying/associating the corresponding NR-MRB. Alternatively, the information for identifying/associating the PDCP entity may indicate an application ID associated with the corresponding MBS session. Alternatively, the information for identifying/associating the PDCP entity may be any information (e.g., TMGI, MBS-sessionID for identifying session-ID and the MBS session, PDU session ID for identifying (unicast) PDCU session associated/mapped with the MBMS/MBS session, and QoS flow ID of the MBS session).

The information for identifying/associating the PDCP entity may be transmitted including the above-described information on the NR-MCCH. Alternatively, the above-described information may be transmitted by being included in the RRC message (for each NR-MTCH) transmitted through the NR-MCCH. As another example, the above-described information may be transmitted through the dedicated RRC message.

For convenience of description, the embodiments will be described within a case of switching from unicast to multicast within one cell will be described. However, the embodiments are not limited thereto. As described above, the embodiments will be similarly applied to the case of switching from multicast to unicast.

For example, the UE establishes the PDCP entity included in the MRB.

As another example, the UE may reconfigure the PDCP entity included in the DRB of the unicast transmission scheme into the PDCP entity for the NR-MRB.

As another example, the UE may reestablish the PDCP entity included in the DRB of the unicast transmission scheme into the PDCP entity for the NR-MRB. In addition, the indication information (reestablishPDCP) for reestablishing the PDCP entity may be included in the RRC message and received by the UE.

As another example, the UE may recover the PDCP entity included in the DRB of the unicast transmission scheme as the PDCP entity for the NR-MRB. For this, the indication information (recoverPDCP) may be included in the RRC message and received.

The UE establishes/reconfigures/reestablishes/PDCP data-recovers the PDCP entity. In this case, according to the received PDCP configuration information (pdcp-Config), the PDCP entity may be established/reconfigured/reestablished/PDCP data-recovered.

The UE establishes the RLC entity for the corresponding MRB. Alternatively, the UE reestablishes the RLC entity for the corresponding MRB.

The UE configures the applicable NR-MTCH logical channel for the corresponding MRB. For the corresponding service, the UE instructs the MAC to receive the DL-SCH using information (e.g., NR-G-RNTI, NR-MTCH scheduling information) included in the NR-MCCH message.

The UE constitutes a physical layer.

The UE notifies the higher layer of the MRB establishment for the corresponding service session (TMGI, session-ID).

The following operation may be additionally performed to support lossless transmission or to efficiently transmit data. The operation to be described below may be performed together with the MRB establishment/reconfiguration, or the operation may be performed at a previous point in time or may be performed at a later point in time.

The PDCP entity of the unicast radio bearer of the UE unicast radio bearer may transmit the PDCP status report to the base station. For example, the status report may include an first missing count (FMC) field and a bitmap field. The FMC field indicates the COUNT value of the first missing PDCP SDU within the reordering window, and the bitmap field indicates which SDUs are missing and which SDUs are correctly received in the receiving PDCP entity. The bit position of Nth bit in the Bitmap is N, i.e., the bit position of the first bit in the Bitmap is 1.

The UE may transmit the status report to the base station when the base station instructs switching for a radio bearer configured with information (statusReportRequired) for instructing to transmit the PDCP status report. Alternatively, when the higher layer requests the PDCP entity reconfiguration or the PDCP data recovery, the status report may be transmitted to the base station.

The base station transmits the corresponding service data being transmitted through the unicast bearer through the MRB. The base station may consider an SN state of the unicast bearer for efficient transmission. For example, the base station may consider the downlink PDCP SN transmission state. This may be the next RLC SN to be allocated to a new SDU without the base station having the PDCP SN yet. When the base station is transmitting the corresponding service data to one or more UEs in the corresponding cell through the unicast bearer and when the base station transmits the corresponding service data through the multicast bearer, the base station may first transmit the PDCP SDU having the earliest (earliest) or lowest SN among the PDCP SNs of the corresponding UEs. Alternatively, when there is a missing PDCP SDU, the base station may first transmit the PDCP SDU having the earliest or lowest SN among the first missing PDCP SDUs of the corresponding UEs. Alternatively, when there is an unacknowledged PDCP SDU, the base station may first transmit the PDCP SDU having the earliest or lowest SN among the first missing PDCP SDUs of the corresponding UEs.

The base station may consider the status report received from the UE when transmitting the corresponding service data being transmitted through the unicast bearer through the MRB. For example, the UE may transmit the corresponding service data through the multicast bearer from the next PDCP SN of the last SN (or the last received SN) sequentially received. As another example, the PDCP SDU having the SN detected as being lost in the UE may be transmitted through the multicast bearer.

The UE may receive data through the MRB.

The UE may release the unicast DRB for the corresponding service.

The UE notifies the higher layer of the unicast DRB release for the corresponding service session (TMGI, session-ID).

Embodiment of Switching by Defining Split Bearer Structure

Figure 14:
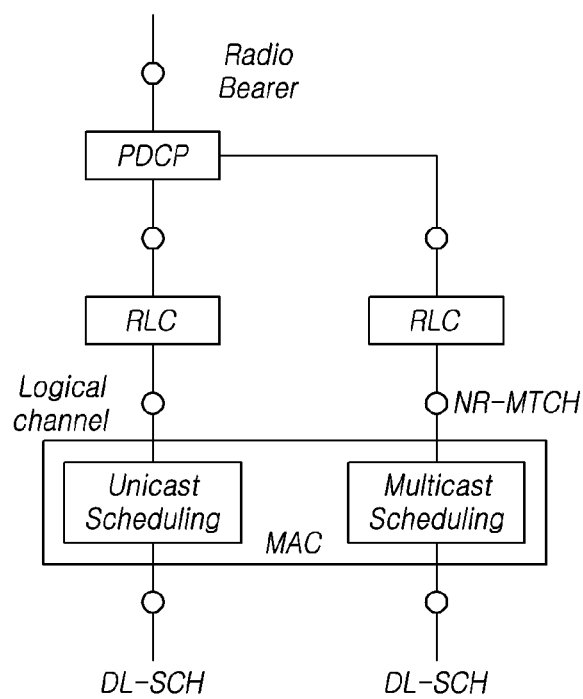
FIG. 14 is a diagram illustrating a layer 2 structure for NR MBS data transmission/reception according to another embodiment.

FIG. 14 is a diagram illustrating a layer 2 structure for NR MBS data transmission/reception according to another embodiment.

Referring to FIG. 14, a radio bearer structure for one MBS service session may be defined as a split bearer structure having two legs/paths. In this case, lossless transmission may be easily provided when the switching between the unicast transmission and the multicast transmission is performed. In addition, in this case, service interruption is minimized, and the switching may be performed quickly. Alternatively, the switching between the unicast transmission and the multicast transmission may be performed without a separate switching instruction. Alternatively, lossless transmission may be easily provided when the switching between a general radio bearer and an MBR using a split bearer structure is performed. In addition, service interruption may be minimized, and the switching may be performed quickly. In this case, the unicast transmission type of the present disclosure indicates unicast using a general radio bearer structure, and the multicast or broadcast transmission type indicates multicast or broadcast using the MRB based on the split bearer structure.

For example, one leg/path of the radio bearer may include L2 entities by unicast DRB, and the other leg/path may include L2 entities by MRB. A unicast DRB RLC entity may be configured in association with a logical channel ID. And/or the MAC may receive data by scheduling indicated by the C-RNTI. The MRB RLC entity may be configured by being associated with the NR-G-RNTI for identifying the transmission of the NR-MTCH for the corresponding session. The unicast DRB RLC entity and the MRB RLC entity may be associated with one PDCP entity. The PDCP entity may be associated with an MBS service session (TMGI and optionally a session ID (sessionId)). The UE may receive the MBS service data transmitted according to the transmission scheme selected by the base station. To this end, the RRC signaling may be used. Alternatively, L2 signaling may be used. Alternatively, user data may be received and processed without signaling.

As described above, according to the present embodiment, it is possible to efficiently transmit the MBS service data in a wireless network.

Hereinafter, the configuration of a base station and a UE capable of performing the above-described embodiment will be briefly described once again with reference to the drawings.

Figure 15:
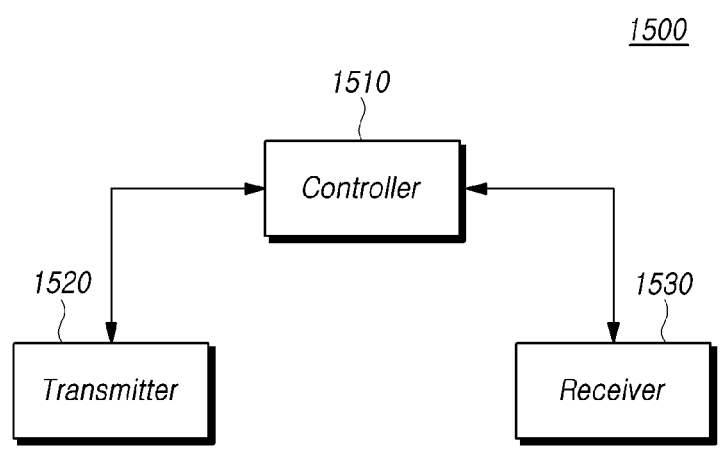
FIG. 15 is a diagram illustrating a base station according to an embodiment.

FIG. 15 is a diagram for describing a base station according to an embodiment.

Referring to FIG. 15, a base station 1500 for switching multicast/broadcast service (MBS) data transmission includes a transmitter 1520 that transmits MBS data to a UE according to a first transmission type, and a controller 1510 that determines whether to change the first transmission type for transmitting MBS data. Also, when it is determined to change the first transmission type to the second transmission type, the transmitter 1520 may transmit switching instruction information to the UE and transmit the MBS data in the second transmission type.

The base station 1500 may receive a session start request message for an MBS service session from a core network control plane entity. Upon receiving the session start request message, the controller 1510 determines a transmission type for MBS data transmission. For example, the base station may determine the first transmission type by using the number of UEs in a cell interested in the corresponding MBS session. The base station may transmit the MBS data to the UE in the determined first transmission type.

Here, when the first transmission type is the unicast transmission type, the second transmission type may be a multicast or broadcast transmission type. Similarly, when the second transmission type is the multicast or broadcast transmission type, the first transmission type may be the unicast transmission type.

In addition, the controller 1510 may determine whether it is necessary to change the transmission type for the MBS data being transmitted in the first transmission type. For example, the controller 1510 may determine whether to change the transmission type in consideration of assistance information received from the UE, feedback information on the corresponding MBS data, reception state information of the UE, radio resource state information, and the like.

When the controller 1510 determines to change the transmission type, the transmitter 1520 may transmit the switching instruction information instructing the change of the transmission type to the UE.

For example, the switching instruction information may be transmitted while being included in at least one of an RRC message, system information, and control information associated with the MBS data transmission.

As another example, the transmitter 1520 may further transmit radio bearer information for receiving MBS data or session information associated with the MBS data together with the switching instruction information or according to a sequentially changed transmission type.

As still another example, the transmitter 1520 may further transmit information for configuring the RLC entity of the UE by linking the RLC entity of the UE to the RNTI for identifying the traffic channel changed according to the second transmission type of the UE. For example, the corresponding information may be the NR-G-RNTI.

Upon receiving the switching instruction information and the above-described additional information, the UE processes the configuration within the UE for receiving the MBS data in the second transmission type. For example, in order to receive the MBS data in the second transmission type, the UE may establish/reconfigure/configure the related radio bearer, RLC, or PDCP configuration within the UE.

For example, when the second transmission type is the multicast or broadcast transmission type, the UE may configure the PDCP entity associated with a radio bearer for processing the MBS data through the multicast or broadcast transmission type.

As another example, when the first transmission type is the multicast or broadcast transmission type, the UE may use the first transmission type to configure the PDCP entity associated with the radio bearer for processing the MBS data through the multicast or broadcast transmission type before receiving the MBS data.

As still another example, the UE may reconfigure the related RLC entity according to the unicast or multicast/broadcast transmission type.

Meanwhile, the transmitter 1520 may change the MBS data to the second transmission type indicated by the switching instruction information and transmit the MBS data.

For example, the controller 1510 may determine the PDCP SDU for transmission in the second transmission type based on the PDCP status report information received from the UE in order to prevent the continuity and omission of data when transmitting the MBS data by changing the transmission type.

For example, when the first transmission type is the unicast transmission type and the second transmission type is the multicast/broadcast transmission type, the controller 1510 may determine to first transmit a PDCP SDU having an earliest or lowest sequence number (SN) among packet data convergence protocol serial data unit sequence numbers (PDCP SNs) or radio link control sequence numbers (RLC SNs) of a plurality of UEs that have received MBS data in the first transmission type.

As another example, when the first transmission type is the multicast/broadcast transmission type and the second transmission type is the unicast transmission type, the controller 1510 may determine to transmit the PDCP SDU for each UE in the second transmission type in consideration of the PDCP SN or RLC SN for each UE that is receiving the MBS data in the first transmission type.

As still another example, a receiver 1530 may receive the PDCP status report information from the UE for normal transmission of the PDCP SDU according to the change of the transmission type.

In addition, the controller 1510 controls the overall operation of the base station 1500 according to the efficient transmission and reception of the MBS service data in the wireless network required to perform the above-described embodiments.

The transmitter 1520 and the receiver 1530 are used to transmit/receive signals, messages, and data necessary for performing the above-described embodiment to/from the UE.

Figure 16:
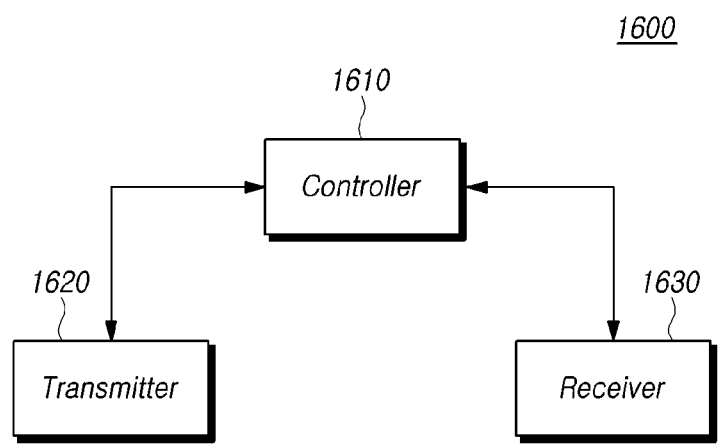
FIG. 16 is a diagram illustrating a UE according to an embodiment.

FIG. 16 is a diagram for describing a UE according to an embodiment.

Referring to FIG. 16, a UE 1600 that switches reception of multicast/broadcast service data receives MBS data from a base station according to a first transmission type, and when the base station determines to change the first transmission type to the second transmission type, may include a receiver 1630 that receives switching instruction information from the base station, and a controller 1610 that performs processing for receiving the MBS data in the second transmission type based on the switching instruction information.

Also, the receiver 1630 receives the MBS data in the second transmission type. Here, when the first transmission type is the unicast transmission type, the second transmission type may be the multicast or broadcast transmission type, and when the second transmission type is the multicast or broadcast transmission type, the first transmission type may be the unicast transmission type.

For example, the base station may receive a session start request message for an MBS service session from a core network control plane entity. Upon receiving the session start request message, the base station determines a transmission type for MBS data transmission. For example, the base station may determine the first transmission type by using the number of UEs in a cell interested in the corresponding MBS session. The receiver 1630 may receive the MBS data in the first transmission type determined by the base station.

Alternatively, a transmitter 1620 may transmit information on an MBS of interest to the base station, and thus, the base station may use the information to determine the transmission type.

Meanwhile, the base station may determine whether it is necessary to change the transmission type of the MBS data being transmitted in the first transmission type. For example, the base station may determine whether to change the transmission type in consideration of assistance information received from the UE, feedback information on the corresponding MBS data, reception state information of the UE, radio resource state information, and the like. To this end, the transmitter 1620 may transmit at least one of the assistance information, the feedback information on the MBS data reception, the reception status information of the UE, and the radio resource status information to the base station.

Meanwhile, the receiver 1630 may receive the switching instruction information.

For example, the switching instruction information may be received while being included in at least one of an RRC message, system information, and control information associated with the MBS data transmission.

As another example, the receiver 1630 may further receive the radio bearer information for receiving MBS data or session information associated with the MBS data together with the switching instruction information or according to a sequentially changed transmission type.

As still another example, the receiver 1630 may further receive information for configuring the RLC entity of the UE by linking the RLC entity of the UE to the RNTI for identifying the traffic channel changed according to the second transmission type of the UE. For example, the corresponding information may be the NR-G-RNTI.

Upon receiving the switching instruction information and the above-described additional information, the controller 1610 processes the configuration within the UE for receiving the MBS data in the second transmission type. For example, in order to receive the MBS data in the second transmission type, the controller 1610 may establish/reconfigure/configure the related radio bearer, RLC, or PDCP configuration within the UE.

For example, when the second transmission type is the multicast or broadcast transmission type, the controller 1610 may configure the PDCP entity associated with a radio bearer for processing the MBS data through the multicast or broadcast transmission type.

As another example, when the first transmission type is the multicast or broadcast transmission type, the controller 1610 may use the first transmission type to configure the PDCP entity associated with the radio bearer for processing the MBS data through the multicast or broadcast transmission type before receiving the MBS data.

As still another example, the controller 1610 may reconfigure the related RLC entity according to the unicast or multicast/broadcast transmission type.

The receiver 1630 may receive the MBS data in the second transmission type indicated by the switching instruction information.

For example, the base station may determine the PDCP SDU for transmission in the second transmission type based on the PDCP status report information received from the UE in order to prevent the continuity and omission of data when transmitting the MBS data by changing the transmission type.

As an example, when the first transmission type is the unicast transmission type and the second transmission type is the multicast/broadcast transmission type, the base station may first transmit a PDCP SDU having an earliest or lowest sequence number (SN) among packet data convergence protocol serial data unit sequence numbers (PDCP SNs) or radio link control sequence numbers (RLC SNs) of a plurality of UEs that have received MBS data in the first transmission type.

As another example, when the first transmission type is the multicast/broadcast transmission type and the second transmission type is the unicast transmission type, the base station may transmit the PDCP SDU for each UE in the second transmission type in consideration of the PDCP SN or RLC SN for each UE that is receiving the MBS data in the first transmission type.

As still another example, prior to the receiving of the MBS data in the second transmission type, the transmitter 1620 may further perform an operation of transmitting the PDCP status report information for the MBS data received in the first transmission type to the base station. Accordingly, the MBS data received in the second transmission type may be the PDCP SDU determined based on the PDCP status report information.

In addition, the controller 1610 controls the overall operation of the UE 1600 according to the efficient transmission and reception of the MBS service data in the UE required to perform the above-described embodiments.

The transmitter 1620 and the receiver 1630 are used to transmit/receive signals, messages, and data necessary for performing the above-described embodiment to/from the base station.

The above-described embodiments of the present disclosure may be supported by standard documents disclosed in at least one of wireless access systems IEEE 802, 3GPP and 3GPP2. That is, steps, configurations, and parts not described in order to clearly reveal the present technical idea among the present embodiments may be supported by the above-described standard documents. In addition, all terms disclosed in the present specification may be described by the standard documents described above.

The above-described embodiments of the present disclosure may be implemented through various means. For example, embodiments of the present disclosure may be implemented by hardware, firmware, software, a combination thereof, or the like.

In the case in which the embodiment of the present disclosure is implemented by hardware, the method according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case of implementation using firmware or software, the method according to the embodiments of the present disclosure may be implemented in the form of an apparatus, a procedure, a function, or the like for performing the functions or operations described above. Software code may be stored in a memory unit and executed by a processor. The memory unit may be positioned inside or outside the processor and transmit and receive data to and from the processor by various well-known means.

Also, the terms "system," "processor," "controller," "component," "module," "interface," "model," "unit," etc., as described above generally refer to computer-related entity hardware, a combination of hardware and software, software, or running software. For example, the above-described component may be, but is not limited to, a process run by a processor, a processor, a controller, a control processor, an entity, an execution thread, a program, and/or a computer. For example, all of an application running on a controller or processor and a controller or processor may be components. One or more components may reside within the processor and/or the execution thread, and the components may be located on one device (e.g., a system, a computing device, etc.) or distributed in two or more devices.

The above description is merely illustrative of the spirit of the present disclosure, and those of ordinary skill in the art to which the present disclosure pertains may make various modifications and variations without departing from the essential characteristics of the present disclosure. In addition, the present embodiments are intended to describe, not to limit the spirit of the present disclosure. Accordingly, the scope of the present disclosure is not limited by these embodiments. The scope of the present disclosure should be interpreted by the following claims, and it is to be interpreted that all the ideas equivalent to the following claims fall within the scope of the present disclosure.

The invention claimed is:

1. A method of controlling multicast/broadcast service (MBS) data transmission by a base station, the method comprising:
    transmitting configuration information for receiving MBS data of a user equipment (UE) to the UE;
    transmitting, to the UE, information for instructing the UE to change a radio bearer for receiving the MBS data; and
    receiving a packet data convergence protocol (PDCP) status report from the UE,
    wherein the configuration information for the MBS data reception includes radio bearer information for a radio bearer having a radio link control (RLC) entity for point-to-point transmission, MBS radio bearer information for a MBS radio bearer having one RLC entity for point-to-multipoint transmission, and split radio bearer information for single radio bearer having one RLC entity for point-to-point transmission and another RLC entity for point-to-multipoint transmission, and
    wherein the split radio bearer information having both of the one RLC entity for the point-to-point transmission and the another RLC entity for the point-to-multipoint transmission is configured in association with one PDCP entity.

2. The method of claim 1, wherein the RLC entity is one of a radio link control-unacknowledged mode (RLC-UM) entity and a radio link control-acknowledged mode (RLC-AM) entity.

3. The method of claim 1, wherein the RLC entity for the point-to-point transmission is associated with unicast scheduling, and the RLC entity for the point-to-multipoint transmission is associated with scheduling for a multicast traffic channel (MTCH).

4. The method of claim 1, wherein the point-to-multipoint transmission is scrambled by a group-radio network temporary identifier (G-RNTI).

5. The method of claim 1, wherein the configuration information for reception of the MBS data includes one or more pieces of information of temporary mobile group identity (TMGI) information for identifying an MBS session, a multipoint radio bearer identifier (MRB identifier) information, PDCP instruction information, PDCP reestablishment indication information, and PDCP recovery instruction information.

6. The method of claim 1, wherein transmission of the PDCP status report is triggered when PDCP reestablishment or PDCP data recovery is requested in a higher layer for a radio bearer configured to transmit the PDCP status report.

7. A method of controlling multicast/broadcast service (MBS) data reception by a user equipment (UE), the method comprising:
    receiving configuration information for receiving MBS data from a base station;
    receiving, from the base station, information for instructing the UE to change a radio bearer for receiving the MBS data; and
    transmitting a packet data convergence protocol (PDCP) status report to the base station,
    wherein the configuration information for receiving the MBS data includes radio bearer information for a radio bearer having a radio link control (RLC) entity for point-to-point transmission, MBS radio bearer information for a MBS radio bearer having one RLC entity for point-to-multipoint transmission, and split radio bearer information for single radio bearer having one RLC entity for point-to-point transmission and another RLC entity for point-to-multipoint transmission, and
    wherein the split radio bearer information having both of the one RLC entity for the point-to-point transmission and the another RLC entity for the point-to-multipoint transmission is configured in association with one PDCP entity.

8. The method of claim 7, wherein the RLC entity is one of an RLC-UM entity and a radio link control-acknowledged mode (RLC-AM) entity.

9. The method of claim 7, wherein the RLC entity for the point-to-point transmission is associated with unicast scheduling, and the RLC entity for the point-to-multipoint transmission is associated with scheduling for a multicast traffic channel (MTCH).

10. The method of claim 7, wherein the configuration information for receiving the MBS data includes one or more pieces of information of temporary mobile group identity (TMGI) information for identifying an MBS session, a multipoint radio bearer (MRB) identifier information, PDCP instruction information, PDCP reestablishment indication information, and PDCP recovery instruction information.

11. The method of claim 7, wherein transmission of the PDCP status report is triggered when PDCP reestablishment or PDCP data recovery is requested in a higher layer for a radio bearer configured to transmit the PDCP status report.

12. A base station for controlling multicast/broadcast service (MBS) data transmission, the base station comprising:
    a transmitter configured to transmit configuration information for receiving MBS data of a user equipment (UE) to the UE and transmit, to the UE, information for instructing the UE to change a radio bearer for receiving the MBS data; and a receiver configured to receive a packet data convergence protocol (PDCP) status report from the UE, wherein the configuration information for receiving the MBS data includes radio bearer information for a radio bearer having a radio link control (RLC) entity for point-to-point transmission, MBS radio bearer information for a MBS radio bearer having one RLC entity for point-to-multipoint transmission, and split radio bearer information for single radio bearer having one RLC entity for point-to-point transmission and another RLC entity for point-to-multipoint transmission, and wherein the split radio bearer information having both of the one RLC entity for the point-to-point transmission and the another RLC entity for the point-to-multipoint transmission is configured in association with one PDCP entity.

13. The base station of claim 12, wherein the configuration information for receiving the MBS data includes one or more pieces of information of temporary mobile group identity (TMGI) information for identifying an MBS session, a multipoint radio bearer (MRB) identifier information, PDCP instruction information, PDCP reestablishment indication information, and PDCP recovery instruction information.

14. The base station of claim 12, wherein transmission of the PDCP status report is triggered when PDCP reestablishment or PDCP data recovery is requested in a higher layer for a radio bearer configured to transmit the PDCP status report.

* * * * *